July 15, 1958  R. F. CHRISTY  2,843,543
NEUTRONIC REACTOR
Filed Oct. 19, 1945  12 Sheets-Sheet 1

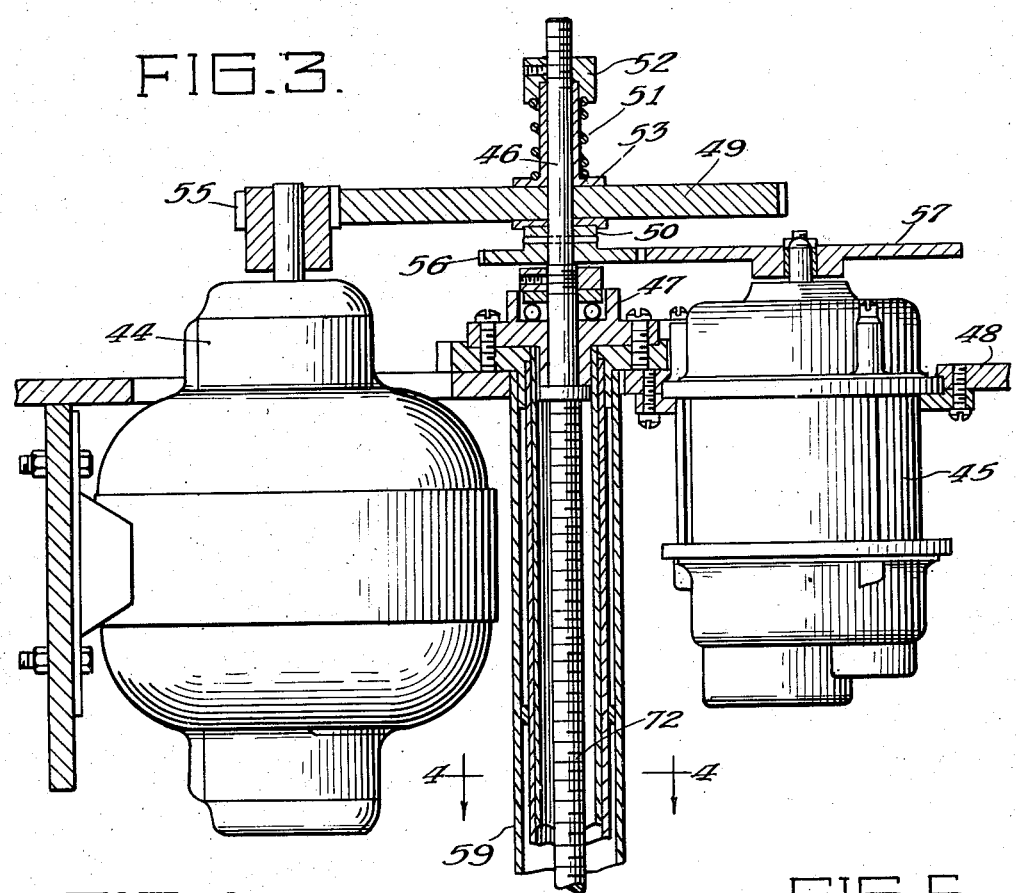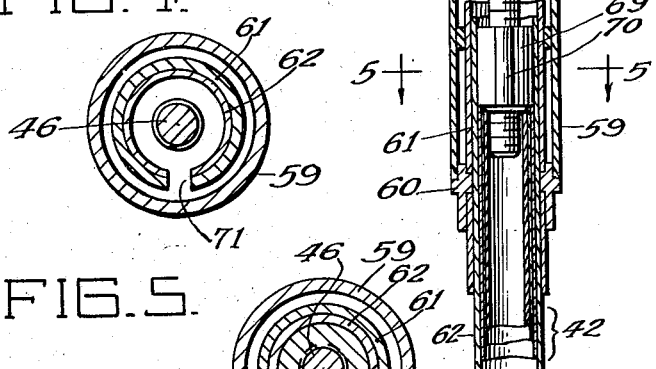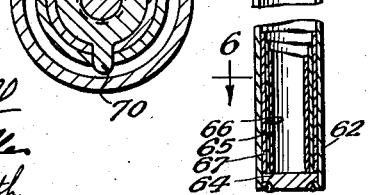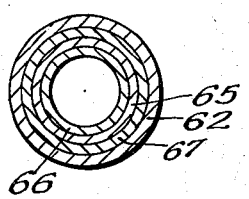

July 15, 1958
R. F. CHRISTY
2,843,543
NEUTRONIC REACTOR
Filed Oct. 19, 1945
12 Sheets-Sheet 4
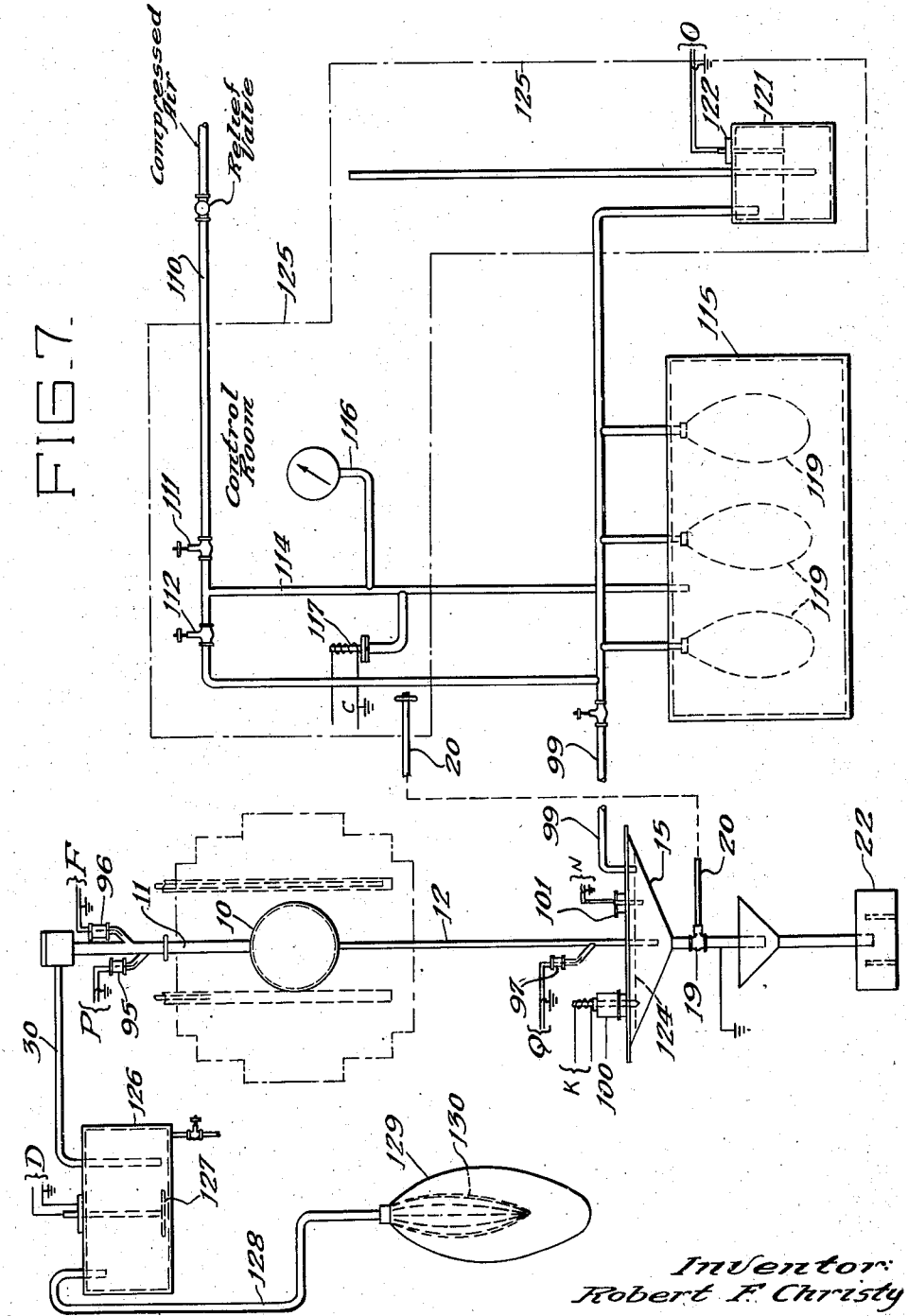
Inventor:
Robert F. Christy
By:
Robert A. ............
Attorney

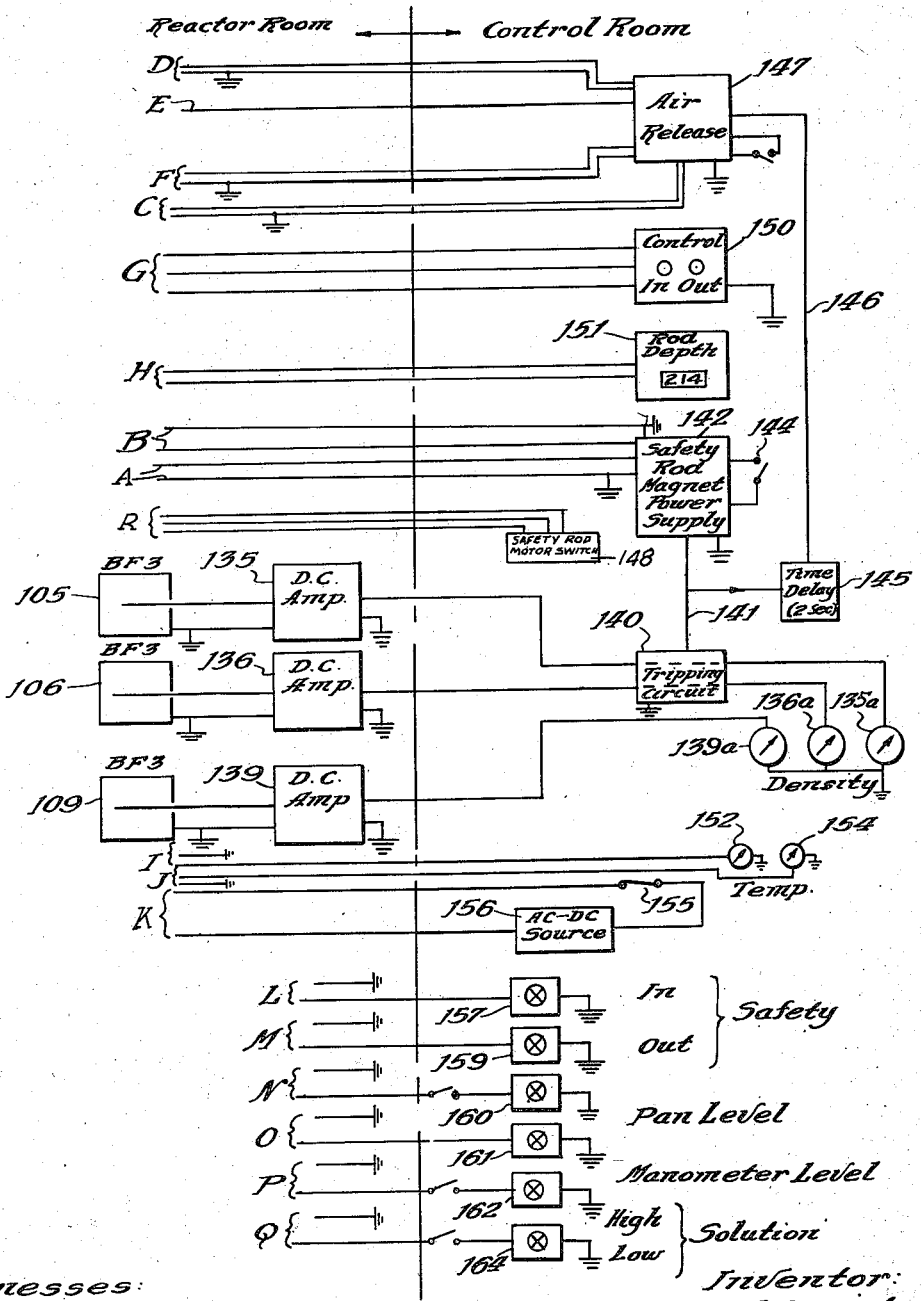

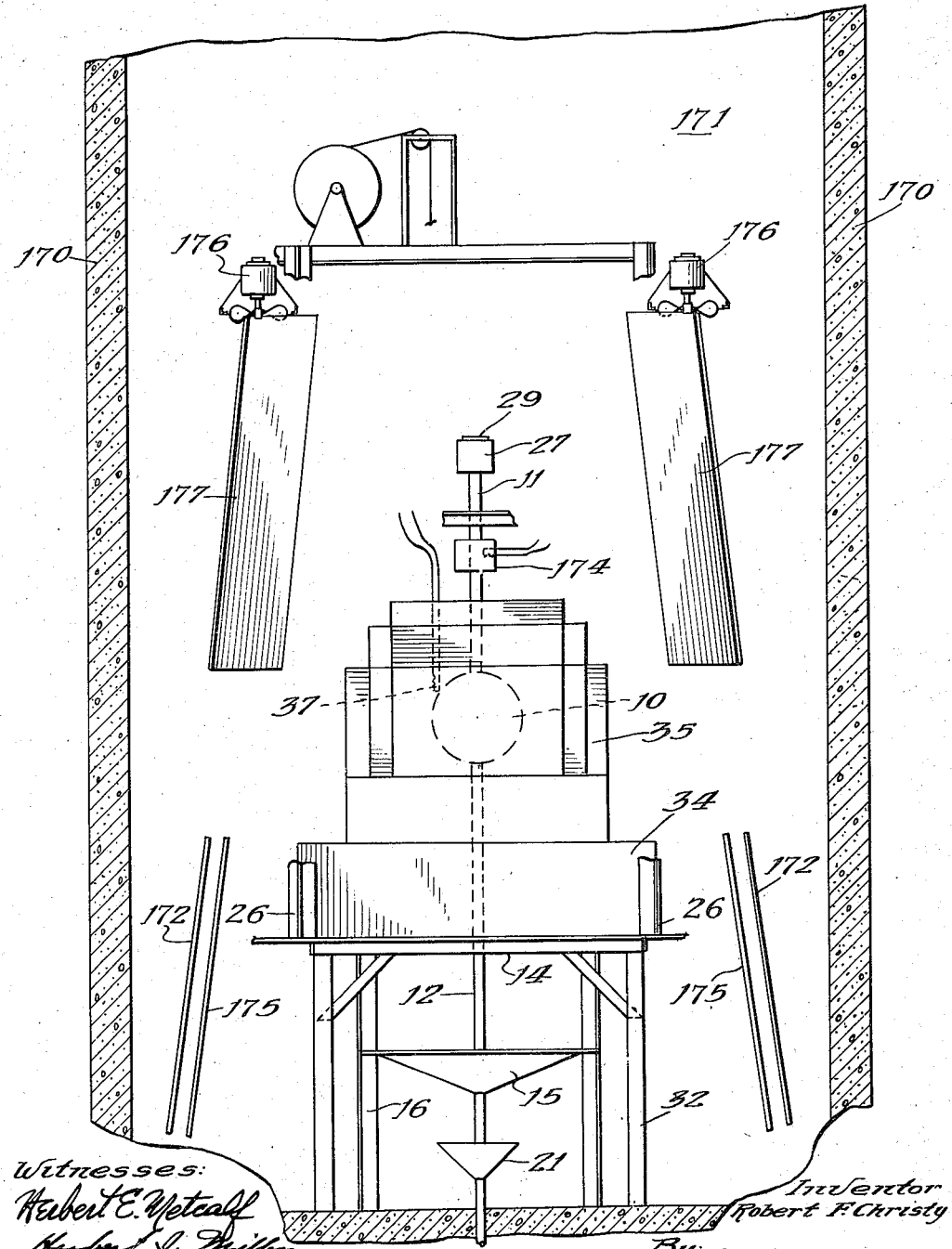

July 15, 1958 R. F. CHRISTY 2,843,543
NEUTRONIC REACTOR
Filed Oct. 19, 1945 12 Sheets-Sheet 7

Witnesses:
Herbert E. Metcalf
Hubert J. Miller
Ralph Carlisle Smith

Inventor:
Robert F. Christy
By: Robert A. _____
Attorney.

July 15, 1958  R. F. CHRISTY  2,843,543
NEUTRONIC REACTOR
Filed Oct. 19, 1945  12 Sheets-Sheet 8

Witnesses:
Herbert E. Metcalf
Herbert S. Miller
Ralph Carlisle Smith

Inventor.
Robert F. Christy
By:
Attorney.

July 15, 1958   R. F. CHRISTY   2,843,543
NEUTRONIC REACTOR
Filed Oct. 19, 1945   12 Sheets-Sheet 12
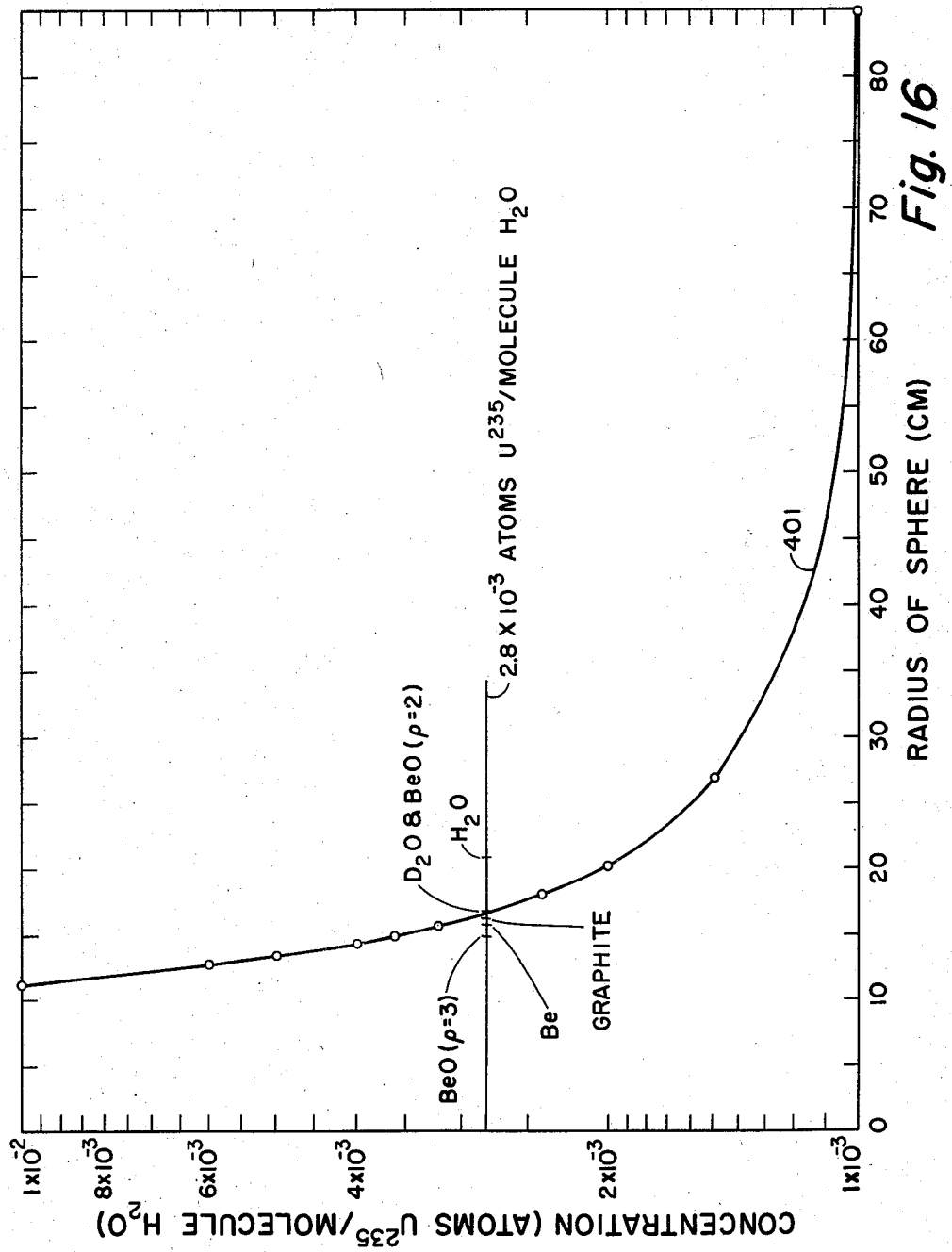
INVENTOR.
Robert F. Christy 2,843,543
Patented July 15, 1958

2,843,543
NEUTRONIC REACTOR

Robert F. Christy, Santa Fe, N. Mex., assignor to the United States of America as represented by the United States Atomic Energy Commission Application October 19, 1945, Serial No. 623,363

25 Claims. (Cl. 204—193.2)

The present invention relates to the release of nuclear energy, and more particularly to devices for maintaining a self-sustaining chain reaction through slow neutron induced fission of various fissionable isotopes.

It is generally known that certain atomic nuclei will undergo fission upon absorption of a slow neutron and will yield through this process two nuclei, the sum of whose atomic numbers is approximately equal to the atomic number of the original nucleus. However, a mass defect exists and a consideration of the process in terms of the conservation of energy reveals that a substantial amount of energy is released during the fission process. Furthermore, on the average, more than one fast neutron is emitted for every neutron absorbed to initiate fission.

It is therefore clear that, if the fast neutrons produced by fission can be made to cause new fissions in such proportion that the overall neutron generation exceeds the overall losses in and from the system, the chain reaction can be divergent to a desired rate of neutron generation. As a consequence, the energy released during the fission process is available in the form of heat and/or radiation for extended periods of time; that is, during the continuance of the chain reaction. The employment of that energy for useful purposes forms the basis of this invention.

The secondary neutrons produced by the fissioning of a fissionable isotope nucleus have a high average energy. More specifically the mean energy in the fission neutron spectrum is in the neighborhood of from 0.5 to 3 million electron volts (M. E. V.), and the mean free path of such neutrons in a substantially solid mass of a fissionable isotope is comparatively short, for example, of the order of five centimeters, the result being that the mean time between fissions in such an arrangement will be of the order of a hundredth of a microsecond. While a fast neutron chain reaction can be maintained in such an arrangement if a sufficient quantity of such a fissionable isotope or material is brought together in favorable geometry, i. e., a quantity in excess of the critical mass value, it has been determined that for the purposes of the present invention, the employment of thermal neutrons to produce fissions permits of a number of advantages.

The requirement that the neutrons employed in a controlled neutron chain reaction of the type contemplated by this invention be slowed to near thermal energies by passing them through a slowing medium called a moderator in which they are slowed by atomic collisions, arises out of the following considerations:

As will be shown in more detail later, the cross section for fission (i. e. the probability that fission will occur under neutron bombardment) increases as the energy of the primary or incident neutron is reduced. In fact, the cross section is approximately inversely proportional to the neutron energy. As a concomitant factor, the various moderators have different efficiencies as neutron slowing media as well as different absorption cross sections for neutrons. By the proper choice of a moderating material, that is one in which the neutrons are quickly slowed to thermal energies and which absorb very few neutrons, it is possible to take advantage of the increased cross section for fission of the fissionable isotope and thereby reduce by as much as a factor of ten the critical mass value or the quantity of material necessary for a self-sustaining chain reaction.

Furthermore, in a fast neutron chain reaction, neutron generation takes place in extremely short periods of time and neutron density rises exponentially with time, thus presenting control problems which are complicated in solution. If on the other hand, the fission neutrons can be slowed down to thermal energies and a chain reaction initiated, since the mean time between fissions in such a reaction will be great, sufficient control over the reaction can be readily maintained and the desired rate of neutron generation fixed at any desired level.

Isotopes that have been determined to be appropriate for slow neutron chain reaction include, for example, isotopes of uranium (element 92) having the atomic weights 233 and 235 and isotope of plutonium (element 94) having the atomic weight 239. These fissionable isotopes have no substantial threshold for the energy of the incident neutron, hence fission may be initiated by a slow or thermal neutron, i. e., a neutron whose energy is approximately that of thermal agitation.

It might be noted also that, for a substantial part of the energy spectrum, the cross-section for fission for these isotopes is almost inversely proportional to the incident or primary neutron energy, that is, the cross-section approximately follows the $$\frac{1}{v}$$

law. Various mixtures of these isotopes in elemental or compound form and mixtures with other elements or isotopes can be used when following the teachings of the present invention, as will be explained hereinafter.

Fermi and Szilard in U. S. Patent No. 2,708,656 issued May 17, 1955, have disclosed methods and means for establishing slow neutron chain reactions which continue in a self-sustaining manner at predetermined levels of neutron density. The system there disclosed provided for the employment of uranium in its normal polyisotopic state, that is, uranium 238 admixed with approximately 0.7 percent of uranium 235, as the fissionable material. Other component elements which form what is now known as a neutronic reactor system include:

(1) A neutron slowing material, known as a moderator, such as graphite in which the fissionable material is dispersed in a geometrical pattern designed to reduce neutron losses.

(2) Heat removal means for example, channels in heat exchange relationship with the reacting mass and through which a suitable coolant is circulated in order to stabilize temperatures in the system.

(3) An outer casing which serves to reflect neutrons back into the system and thereby reduce the quantity (i. e. the critical mass) of fissionable mixture necessary to sustain the reaction. This outer casing is sometimes termed a tamper.

(4) Means for charging the reactive elements into the zone in which the reaction takes place and for removal therefrom of the products of the reaction.

(5) A protective shield is sometimes provided around the reactor to minimize the escape of biologically harmful radiations. Such shields may comprise, for example, bismuth or lead which have been found effective in stopping gamma radiation, hydrogenous materials such as paraffin for absorbing neutrons and/or a massive outer concrete casing.

(6) A monitoring system to determine the reaction conditions at all times.

(7) Control devices generally comprising neutron absorbing materials insertable into the reactive mass to maintain an average state of neutron production and absorption balance at a predetermined level.

(8) A safety device comprising a quantity of neutron absorbing material which may be used to stop the reaction in case of emergency by being automatically inserted into neutron absorbing relationship with the reacting mass.

In considering the requirements for an operating neutronic reactor, the ratio of secondary neutrons produced by the fissions to the original number of primary neutrons of the type required to initiate the fissions in a chain reacting system of infinite size using specific materials is called the reproduction or multiplication factor of the system. The factor is a dimensionless constant and is denoted by the symbol $k$. If $k$ is made sufficiently greater than unity to create a net gain in neutrons over all interior losses, and the system is of proper size so that this gain is not entirely lost by leakage from the exterior surface of the system, then a self-sustaining chain reacting system can be built, to generate neutrons and to produce power in the form of heat by nuclear fission.

Important losses of neutrons within the reacting mass have been found to be by absorption in contaminating impurities which are present with the fissionable mixture (e. g. polyisotopic uranium) or by absorption in uranium 238 without producing fission but instead, leading to the formation of plutonium 239 as will be explained later. The absorption by the contaminating materials varies, but the effect on the $k$ factor may be readily determined by the employment of formulae disclosed in the above mentioned application. The effect of numerous elements has been correlated in this way with the composition of fissionable material and moderator or neutron slowing material. That is, for example, more normal polyisotopic uranium can be added to a particular system to overcome the absorption effects of impurities in the system.

Uranium 238 has an especially strong absorbing power for neutrons which have been slowed to moderate energies. The energy levels at which this absorption is strongest are known as resonance energies, and the neutron capture or absorption by uranium 238 nuclei at these energies is therefore known as the uranium resonance capture or absorption. Such absorption is to be distinguished from absorption in impurities as discussed above.

These two neutron loss factors are most important in the determination of whether a self-sustaining chain reaction can be maintained. Together with the loss of neutron by leakage out of the system, the above mentioned losses govern the size of the reactor. Thus reactors constructed according to prior art principles have been comparatively large, massive installations requiring extremely large quantities of the various elements and/or materials described above.

It should also be noted that the efficiency of a neutron slowing material or moderator, depends upon the scattering cross section of the material and its atomic weight. Thus, for example, hydrogen has a high scattering cross-section and a low atomic weight and is an extremely desirable neutron slowing agent because of the small number of atomic collisions necessary to slow a neutron to thermal energies. When present in the form of water however, the absorption cross-section is comparatively high and the $k$ factors for uranium and water are very close to unity and the advantages of the use of the hydrogen are largely lost.

It has been pointed out above that control means are provided in reactors for stabilizing the neutron density at predetermined levels. Such controls have normally been in the form of neutron absorbing materials inserted directly into the reacting mass, thus effectively taking the neutrons directly out of the reaction. Such controls are subjected to a great deal of fast neutron as well as thermal neutron bombardment and means for cooling them have been found useful if not completely essential.

It will thus be seen that this invention has as an object the provision of a method and means for establishing a self-sustaining slow neutron chain reaction in a compact unit suitable for general use.

It is a further object of the present invention to provide a means and method of so co-relating the essential physical requirements of a fission chain reaction that practical and easily controllable neutronic reactors can be built.

It is a still further object of the present invention to provide means for producing neutrons and radiations for transmutation purposes.

Another object of the present invention is to provide a novel method and means for controlling a self-sustaining slow neutron chain reaction.

Another object of the present invention is to provide a reactor system in which the multiplication factor is independent of most of the neutron losses generally encountered in such a system.

Other objects and advantages will become apparent from the discussion in this specification and from the detailed description of illustrative embodiments which are given by way of example and should not be interpreted to be limitations of the broad pinciples underlying the invention.

The above mentioned objects and advantages are attained by employing a composition of a fissionable isotope and moderator in fluid form, for example, one in which the fissionable isotope is suspended or preferably dissolved in a liquid moderator such as water or heavy water (i. e. deuterium oxide, $D_2O$). In such an arrangement the amount of the fissionable isotope present, to a large extent, governs the reaction and eliminates the problems attendant upon complex impurity removal techniques and the like. In other words, by the use of the methods and principles herein disclosed, the neutron absorption effect caused by (a) the presence of impurities, (b) isotopes which absorb neutrons without resulting in fission, (c) absorption in the moderator, (d) absorption by fission products and like effects, can be readily overcome by the novel expedient of increasing the concentration of the specific fissionable isotope present in the system. Thus, higher neutron losses can be tolerated than is the case when natural polyisotopic uranium is used, but losses still can be overcome to the end that a self-sustaining chain reaction can be maintained. As a consequence, the size of the reactor is no longer a critical factor, the new criterion being the concentration of the fissionable isotope.

It has been noted that among the materials which can be employed in the practice of the present invention are the uranium isotopes of mass 233 and 235 and the plutonium isotope 239, all of which have no substantial threshold for the energy of the incident neutron. These isotopes can be obtained in highly concentrated form by isotopic separation procedures or chemical methods (depending on the isotope or element) and brief mention is made here of such methods as background for this invention and to emphasize further benefits derived from following the novel methods and using the apparatus herein described.

The fissionable isotope uranium 235 may be obtained in several ways. Isotope separation devices such as a mass spectro-separator, similar in operation to a mass spectrograph but with larger ion currents, have been found satisfactory. Another method of separating the uranium 235 isotope from the naturally occurring isotopic mixture is by gas diffusion methods employing uranium hexafluoride gas and diffusion barriers. In both methods the separation is not completed in a single stage, but rather proceeds step-wise, or in cascade fashion, with the accepted portion of each step being further separated and the rejected portion being recycled. It will thus be seen that the fissionable isotope is observed to occur in greater abundance or concentration, with each advancing step in the process.

Uranium 233 may be formed by subjecting a quantity of thorium (element 90) 232 to neutron bombardment, the resulting reaction being as follows:

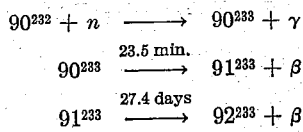

If desired, the uranium 233 can be separated from the thorium parent by chemical methods but as will be seen from the discussion herein, this separation is not necessary if the concentration of the uranium isotope is sufficiently high according to the standards hereinafter set forth.

Plutonium 239 is formed principally by irradiation of uranium 238 with neutrons. As a production method, one way of subjecting large quantities of uranium to a high neutron flux is the employment of a reactor such as is disclosed in the above-mentioned patent of Fermi and Szilard. The reaction leading to the formation of plutonium 239 is:

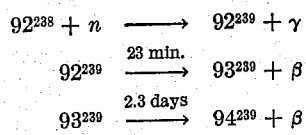

Since the plutonium is formed in the original uranium slugs dispersed in the graphite reactor, chemical extraction and/or precipitation processes may be used to obtain the isotope 239 in a substantially pure state, but here again complete separation is not necessary from the standpoint of the present invention.

It is generally preferred in the practice of the present invention to employ a water soluble salt containing the fissionable isotope in the desired isotopic concentration or in a substantially pure isotopic state. For example, uranyl salts of high water solubility such as uranyl nitrate, uranyl sulphate or uranyl fluoride, plutonium salts such as plutonyl sulphate ($PuO_2SO_4$), plutanyl nitrate ($PuO_2(NO_3)_2$), plutonous nitrate ($Pu(NO_3)_4$), etc. may be dissolved in water and used in the neutron chain reaction herein contemplated.

It will be apparent to one skilled in the art that by employing a composition of a material enriched in a fissionable isotope with a water moderator, and following the practices and standards hereinafter set forth, it is possible to vary the neutron gain (that is, vary the multiplication factor $k$) by increasing the concentration of the fissionable isotope in a given volume. It has been determined that the neutron losses due to the presence of an absorbing isotope such as uranium 238 can be made relatively unimportant without eliminating the uranium 238 from the system. Thus, if an isotopic mixture of uranium 235 and uranium 238 is employed, if the concentration of uranium 235 is sufficiently above that of natural uranium, the losses due to absorption of neutrons by the uranium 238 becomes negligible and can be neglected in the design of a reactor, particularly one using a moderator of high neutron absorption properties such as water even though the amount of uranium 238 is high. It has been determined further, that where the concentration of uranium 235 is above about one percent and preferably above five percent by weight of the uranium present, a great reduction in the amount of uranium in optimum geometry necessary to establish a chain reaction (i. e. the critical mass of uranium required) can be effected, and complete or substantially complete removal of absorbing isotopes or impurities is unnecessary.

For example, if a water moderator is used and the fissionable mixture is the normal isotopic uranium mixture containing 0.7 percent of uranium 235, the quantity of material (in the most favorable geometry) necessary to sustain a chain reaction is extremely large—if a chain reaction can be established at all. By way of comparison, if the enrichment is 180% (the uranium 235 content about two percent of the uranium present), only about 1.7 tons of uranium are required under the same conditions of operation. Even more striking is the determination that when the uranium composition contains fifteen percent of uranium 235 a chain reaction can be maintained, under similar conditions, when only a few kilograms of the composition are used. Further reductions of these critical mass values can be secured through the use of neutron reflectors to cut down leakage losses, but the use of such reflectors does not affect the general principles here noted.

The critical mass values for a reactor of substantially spherical geometry, as well as the critical dimensions and concentration of the fissionable isotope and the interdependence of these criteria for fissionable isotopes such as have been mentioned, may be calculated as follows:

The neutron distribution in a reactor as a function of the radius of the reactor is the solution of the diffusion equation:

$$\Delta n + \frac{(kP_t - 1)}{L^2} n = 0 \qquad (1)$$

where $n$ is the neutron density, $\Delta n$, where $\Delta$ is the Loplocian operator, is defined by the relation:

$$n = \frac{\delta^2 n}{\delta x^2} + \frac{\delta^2 n}{\delta y^2} + \frac{\delta n^2}{\delta z^2}$$

for a system with cartesian coordinates $x$, $y$ and $z$, $P_t$ is the probability of a neutron being slowed to thermal energies before leaking out of the reacting mass, $k$ is the reproduction factor for an infinite medium, and $L$ is the thermal diffusion length of the neutrons in the dispersion of the fissionable isotope in moderator. If the solution (for a spherical homogeneous reactor where $r$ is the radius of the reactor) is written $$\frac{\sin Kr}{r}$$

then $$K^2 L^2 = kP_t(K) - 1 \qquad (2)$$

where $K$ is a constant.

Let the concentration of fissionable isotope be measured by $$X = \frac{\text{thermal absorption by the fissionable isotope per unit volume}}{\text{thermal absorption by moderator per unit volume}}$$

Then $$L^2 = \frac{L_0^2}{(1+X)\left(1 + \frac{1}{5}\frac{\sigma_{at}(M)}{\sigma_{st}(M)}X\right)} \qquad (3)$$

where $L_0$ is the thermal diffusion length of the neutrons in the pure moderator and $\sigma_{at}(M)$ and $\sigma_{st}(M)$ are respectively the thermal neutron absorption and thermal neutron scattering cross-sections of the moderator. The second term in the denominator is a usually negligible correction to the total cross-section. It is assumed that the presence of the fissionable isotope does not appreciably change the number of hydrogen nuclei per cubic centimeter of the reacting solution. Also $$k = \frac{V_e X}{1 + X} \qquad (4)$$

where $V_e$ is the effective number of neutrons per thermal fission of the fissionable isotope and includes the additional neutrons formed by fast fission and is further defined by the relation $$Ve = V\left[1 + (V-1)\frac{5.5\sigma_{at}(M)\sigma_{af}(F)}{\xi\sigma_{sf}(M)\sigma_{at}(F)}P_1(K)X\right] \qquad (5)$$

where $\sigma_{sf}(M)$ and $\sigma_{af}(F)$ are the fast neutron scattering cross-section of the moderator and the absorption (and hence the fissioning) cross-section of the fissionable isotopes respectively, $\sigma_{at}(F)$ is the absorption cross-section of the fissionable isotope for thermal neutrons and $V$ is the actual number of neutrons produced per fission. The term "fast fission" includes the range where the fission cross-section is essentially constant, i. e., from 10,000 e. v. up to fission energies. Or stated another way, it was assumed that the fast fission cross section of about 1 Barn ($10^{-24}$ cm.²) remained constant down to an energy E, expressed in electron volts and defined by $$\frac{\sigma_{at}(F)}{\sqrt{40E}}=1$$

The region of energies greater than E was taken for the fast group. The number of collisions necessary to slow a neutron to thermal energies is then $$\frac{5.5}{\xi}$$

where $\xi$ is the mean natural logarithmic energy decrement per collision in the moderating medium, $P_1(K)$ is the average probability of escaping leakage for these energies. Then $$\frac{\sigma_{at}(M)\sigma_{af}(F)}{\sigma_{sf}(M)\sigma_{at}(F)}X$$

gives the probability that a collision results in fission, $$\frac{\sigma_{at}(M)}{\sigma_{at}(F)}X$$

is only a measure of the concentration of fissionable isotope.

Substituting (3), (4), (5), in (2) the result is $$\frac{K^2L_0^2}{\left(1+\frac{1}{5}\frac{\sigma_{at}(M)}{\sigma_{st}(M)}X\right)}=$$

$$V\left[1+(V-1)\frac{5.5\sigma_{at}(M)\sigma_{af}(F)}{\xi\sigma_{sf}(M)\sigma_{at}(F)}P_1(K)X\right]XP_t(K)-(1+X) \quad (6)$$

Expanding the denominator on the left, one gets a quadratic equation for X.

$$\frac{V(V-1)5.5\sigma_{at}(M)\sigma_{af}(F)}{\xi\sigma_{sf}(M)\sigma_{at}(F)}P_1(K)P_t(K)X^2+$$

$$\left[VP_t(K)-1+\frac{1}{5}\frac{\sigma_{at}(M)}{\sigma_{st}(M)}K^2L_0^2\right]X-[1+K^2L_0^2]=0 \quad (7)$$

When Fermi's concept of neutron age applies in the slowing down precedure, so that the distribution of nascent thermal neutrons from a point source of fast neutrons can be written $$e-\frac{r^2}{4\tau}$$

in which $r$ is a distance from the source, then $$P_t(K)=e^{-K^2\tau}$$

and $$P_1(K)=e^{-K^2\tau_1}$$

$\tau$ is the neutron age which is ⅙ of the mean square displacement of a neutron from place of birth to the point at which the neutron reaches the energy for which the computations are to be made. $\tau_1$ is the appropriate age of the fast neutrons making fast fission and is the range of the neutron for the first few collisions. In water, the distribution of energetic neutrons from a fission source is $$\frac{1}{r^2}e-\frac{r}{l}$$

After the first few collisions, the distribution spreads in an approximately Gaussian manner with an age $\tau$ from this lower energy to thermal energies. This consideration leads $$P_1(K)=\frac{\tan^{-1}Kl}{Kl}$$

and $$P_t(K)=\frac{\tan^{-1}Kl}{Kl}e^{-K^2\tau}$$

where $l$ is defined as the fast neutron mean free path.

The Equation 7 for X is solved for various values of K. Then the density of a fissionable isotope such as plutonium 239 which is proportional to X is known as a function of the critical dimensions of the mixture. For a sphere $$R_s=\frac{\pi}{K}$$

for a cylinder of infinite length $$R_c=\frac{2.4048}{K}$$

and for a slab the thickness $$T=\frac{\pi}{K}$$

This permits calculation of the critical mass, mass/cm., and mass/cm.² of plutonium 239, for example, respectively for a sphere, cylinder, and slab, as a function of the density of plutonium 239, or as a function of the dimensions.

Except for the region of large density, the critical mass of uranium 235 or uranium 233 is greater than that of plutonium 239 by the factor $$\frac{\sigma_{at}(Pu^{239})}{\sigma_{at}(U^{235})}$$

or $$\frac{\sigma_{at}(Pu^{239})}{\sigma_{at}(U^{233})}$$

i. e., by 1.7 or 1 for the same dimensions of the mixture.

Since the function of the moderating medium, i. e. water, heavy water ($D_2O$) or the other low atomic number element having a low capture cross-section, is to slow the fission neutrons, the critical size will be of the order of the slowing down distance. The minimum concentration is such that only one of the 2.13 effective neutrons per absorption in a uranium 235 nucleus and 1.98 effective neutrons per absorption in a plutonium 239 nucleus is absorbed by the chain reactive fissionable isotope compound, the thermal neutron absorption by the fissionable material will then be about equal to that by the moderator; the optimum concentration (minimum critical mass in a sphere) will be about three times this minimum.

The control of a neutronic reactor is an important factor, since if the reaction is permitted to occur at an unduly rapid rate the reaction will take place with explosive violence. Control of a neutronic reaction may be effected by variation of one or more of the above losses or by variation in the concentration of fissionable isotope. For example, the reactor may be controlled by introducing into or withdrawing from the reaction zone high neutron absorbers such as cadmium or boron usually in the form of control rods.

In accordance with the present invention it has been found that a neutronic reactor may be effectively controlled by variation of the leakage from the reacting composition. Thus a neutronic reactor has been constructed which is below critical size, i. e., the size of the reactor is so small that leakage of neutrons from the reacting composition without a reflector is too great and this loss alone prevents establishment of a neutronic self-sustaining reaction. But when this reactor is provided with a reflector which reflects enough neutrons back into the reaction zone to reduce the leakage loss, a point can be reached such that a self-sustaining neutron chain reaction can be established. The reflector is also provided with means to vary the amount of neutrons so reflected. For example such a means may comprise one or more neutron absorbing control rods which may be removably inserted in the reflector to absorb neutrons therein. As another means to accomplish this purpose, for example, a portion of the reflector may be blocked off by neutron absorbers if desired or the amount of reflector or its depth may be varied. At all events the reactor may be controlled by control of the leakage factor which may be defined as the difference between the number of neutrons per fission leaking from the reaction zone and the number of neutrons per fission which are returned to the reaction zone after leaking. This feature of the invention is applicable to neutronic reactors generally.

In order that the significance of a control by neutron absorbing impurities be more fully understood, the mechanism of fission will be discussed further. Not all of the fast neutrons originating in the fission process are emitted immediately. Each chain reacting system has a characteristic time for neutron generation based upon the percent of enrichment of fissionable isotope employed in the composition with the moderator, the type of moderator, the reflector used and the like. This characteristic time may be used as a base to which may be related the determination of whether the neutrons emitted in the fission process are "prompt" or "delayed." In the fission of uranium 235 about one percent may be termed "delayed" neutrons, although the percentage varies for the different isotopes. These delayed fast neutrons may appear at any time up to several minutes after the fission has occurred. In uranium 235 for example, half of these neutrons are emitted within six seconds and 0.9 within 45 seconds. The mean time of delayed emission is about 5 seconds. The neutron reproduction cycle is completed by 99 percent of the neutrons in about 0.00003 second in a fluid type reactor system employing a water moderator such as forms the basis of the present invention, although the dependence of this value on the moderator chosen should be noted. But if the reactor is operating with a reproduction ratio near unity, the extra one percent may make all the difference between an increase or a decrease in the activity of the reactor. The fact that the last neutron in the cycle is held back, as it were, imparts a slowness of response by the reactor system to the changes in the control means that would not be present if the fission neutrons were all emitted instantaneously.

For cases in which the reproduction ratio (R) differs from unity by appreciably less than one percent, the rise of neutron density, or more specifically the value $N$ to which the number of neutrons has risen from an original value $N_0$, after a lapse of time of $t$ seconds during and before which the pile has operated at a fixed value of $R$ ($N_0$ being the number of neutrons at the beginning of $t$, i. e., after disappearance of transient effects due to any preceding change in $R$), is given by $N=N_0 e^{wt}$ where $$w = \frac{R-1}{\alpha - (R-1)} \cdot \frac{1}{T}$$

In this formula $\alpha$ is the fraction of the neutrons that are delayed, e. g., in the case of the uranium 235 isotope $\alpha = 0.0067$, T is the mean delay time for the delayed neutrons which is in the neighborhood of five seconds in the case of the same isotope and R is the reproduction ratio of the system. The above formula is only approximate and applicable for low values of R because it uses an average delay time.

As an example, suppose as a result of moving the control rod R becomes 1.001, and assume that the system has settled down to a steady exponential rise in neutron density, then $$w = \frac{0.001}{0.0067 - 0.001} \cdot \frac{1}{5} = \frac{1}{28.5}$$

that is, $N/N_0 = 2.72$ in 28.5 seconds. Hence, doubling of the neutron density occurs about every 20 seconds and continues indefinitely. The above formula thus indicates the rate of rise for relatively low values of R and shows how the reduction of the rate of the delayed neutron effect is particularly significant in the stated lower range of R values. Strictly speaking, the given equation holds only for the steady state, i. e., where R has been held constant for some time; an additional transient term must be included to obtain an accurate representation of the neutron density during the first few seconds after a sudden change of R.

If R were made exactly 1.0067, a more detailed theory shows that the neutron density would be more than tripled each second. However, if the reproduction ratio R is several percent greater than unity, so that the one percent delayed neutrons are unimportant compared with $R-1$, the density increases at a much more rapid rate as given approximately by $(R-0.0067)^{t/l}$ where $l$ is 0.00003 second, the normal time to complete a cycle in a reactor such as is described hereinafter. Thus if R were to be made 1.04, the neutron density would increase in 0.03 second by a factor of approximately $10^{17}$ over its original level. However, if R were 1.02 and 1.03, the factor by which the neutron density would be multiplied each second, would be 1100 and 700,000 respectively. It is thus apparent that too high a reproduction ratio in a practical system leads to the necessity of inserting what may be considered as an excessive amount of controlling absorbers to reduce the effective reproduction ratio to unity. An exceedingly dangerous condition could exist if by accident these absorbers were suddenly completely removed, as the time required for reinserting the absorbing material might be too long to prevent destruction of the system. As the same eventual density can be obtained with a reproduction ratio only slightly over unity, as with a higher ratio, only at a slower rate, the lower reproduction ratios which exceed uinty by not substantially more than about 0.01, or an amount equal to the percentage of the neutrons formed which are "delayed neutrons" are preferred in practice in the interest of safety.

The application of the principles set forth just above to neutronic reactors utilizing high concentrations of fissionable isotopes, will be more fully understood by reference to the drawings wherein a preferred embodiment of the present invention is shown in the form of two neutronic reactors utilizing as the reactive composition therein aqueous ($H_2O$) solutions of uranyl sulphate ($UO_2SO_4$) containing about 14.6 percent of isotope uranium 235 instead of 0.7% as in natural uranium.

In the drawings

Fig. 3 is an enlarged longitudinal sectional view of the control rod shown in Fig. 1;

Figs. 4, 5 and 6 are cross-sectional views, as indicated, of the control rod;

Fig. 7 is a diagram showing the solution handling system;

Fig. 8 is a diagram showing the electrical control and monitoring system;

Fig. 9 is a fragmentary diagrammatic side view partly in section of the temperature control system and reactor room;

Figure 1:
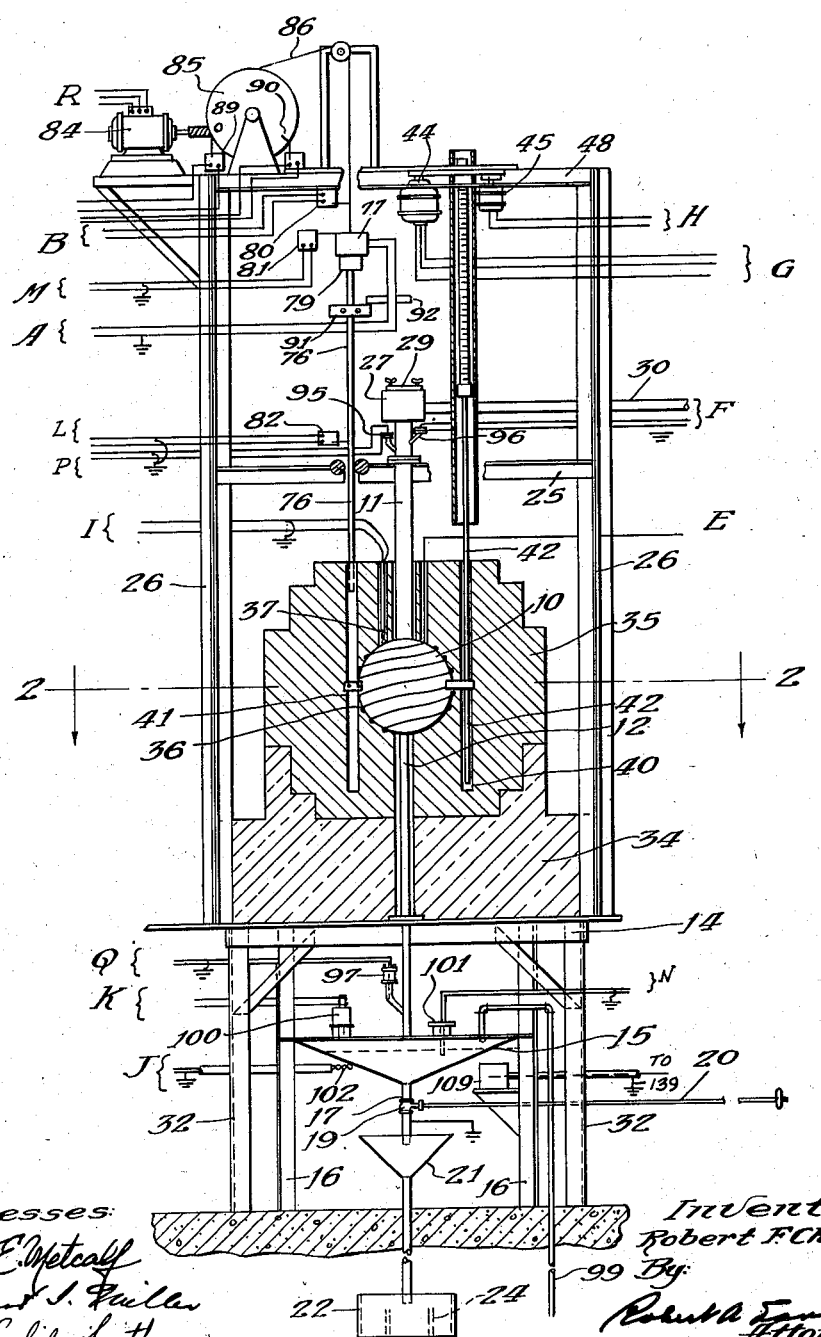
Fig. 1 is a vertical view partly in section and partly in elevation of a neutronic reactor which has been constructed and is adapted to operate at a one watt output illustrating the present invention.
Figure 2:
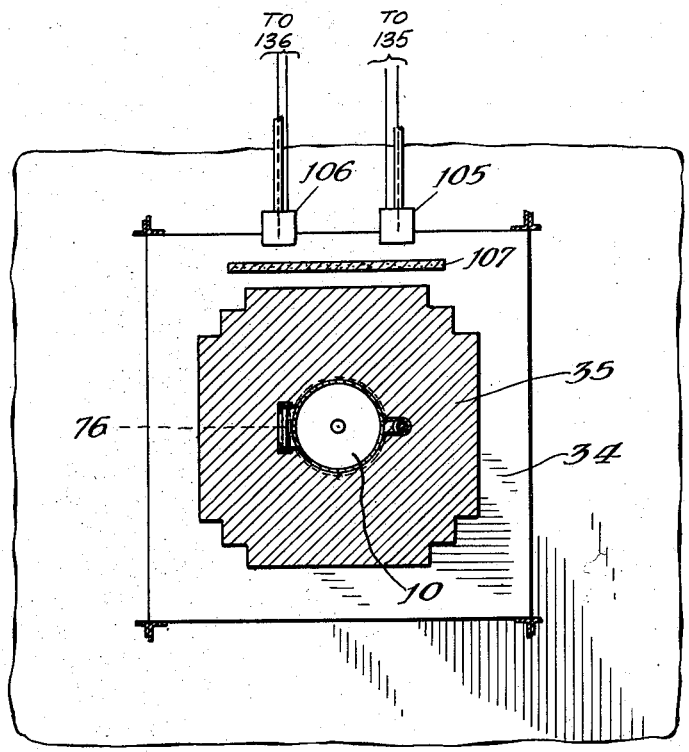
Fig. 2 is a cross-sectional view taken as indicated by the line 2—2 in Fig. 1.

Referring first to Figs. 1 and 2, a reactor tank 10 of spherical form is provided approximately 12 inches in diameter and having a volume of 14.95 liters, made of type 347 18–8 stainless steel, which is sufficiently thin, for example 1/32 inch thick, to absorb but minor amounts of neutrons. The sphere is made from two spun hemispheres with a 3/16 inch equatorial flare, and the hemisphere flares are welded together. Polar flares are also provided, to one of which is welded a top pipe 11. A bottom pipe 12 is welded to the other flare. The top pipe is 1½ inches inside diameter with a 1/16 inch wall and the bottom pipe is 3/4 inch outside diameter with a 1/16 inch wall. Unless otherwise specified hereinafter, all piping in the solution system is of stainless steel.

Referring first to bottom pipe 12. This pipe extends downwardly through a heavy frame base 14 and then through the top of an inverted conical pan 15 to terminate inside thereof just above the bottom point of the pan. Pan 15 is supported on risers 16, which also partially support base 14. Pan 15 can be emptied by a dump pipe 17 under the control of a dump valve 19 having an extension handle 20. A funnel 21 is provided through which contents of sphere 10 and pan 15 can be conducted into a sump 22, when dump valve 19 is open. In view of the neutronic reactivity of the solution to be used in reactor tank 10, tank 22 may be provided with neutron absorbers such as cadmium baffles 24, to prevent neutronic reaction therein.

Top pipe 11 extends upwardly through a cross-frame member 25, this cross-frame member being supported by uprights 26 resting on frame base 14. Above cross-frame member 25 upper pipe 11 terminates in an expanded portion 27 provided with a removable cap 29. An overflow pipe 30 is provided leading outwardly from expanded portion 27. The remainder of the liquid handling system will be explained later.

Inasmuch as a very considerable weight will be placed on base 14, base 14 is additionally supported by base uprights 32. A reflector base 34 formed from carefully machined graphite bricks is piled on base 14, this graphite being of high neutronic purity. Resting on graphite base 34 and surrounding reactor tank 10 is a reflector 35 of beryllium oxide bricks having a density of about 2.7 gms./cm.$^3$, carefully finished to fit together with a minimum of air spaces of maximum neutronic purity, and with bricks adjacent the reactor tank 10 being shaped to the contour of the tank. The beryllium oxide reflector is roughly of spherical shape to provide a neutron reflecting layer around the reactor tank. Before assembling the reflector around the reactor tank, means for detecting leaks in the tank are provided in the form of small, preferably nylon insulated, copper wires 36 wound around the tank 20. While only a single circuit is shown, separate circuits can be used for the top, equator and the bottom of the reactor tank, if desired. If a leak from the tank occurs, the solution will saturate the insulation on the wire and ground it to the reactor tank 10, as will be later described. Thermocouples may also be inserted in various positions around the reactor tank, as indicated by thermocouple 37 positioned adjacent the top of the reactor tank 10.

As the reflector 35 is being assembled, two vertical tangential slots are built into space slightly away from tank 10 in the reflector, a wide control rod slot 40 and a safety rod slot 41 close to tank 10. Both of these slots may be provided with an aluminum lining or scabbard attached to the equator of tank 10. Operating in the control rod slot 40 is a control rod 42. The control rod proper is a strip of .032 inch cadmium 34 inches long, wrapped around a hollow brass tube 3/4 inch in diameter and 34 inches in length, and is moved in a vertical direction with a total length of motion of 40.7 inches by a control rod motor 44, the position of the rod being indicated by "Selsyn" repeater 45. The details of this control rod mechanism is shown more in detail in Figs. 3 to 6 inclusive, and will next be described.

As shown in Fig. 3, a screw shaft 46 is mounted vertically in a screw shaft bearing 47 mounted on top frame member 48 and extends upwardly to receive a spur gear 49 pressed against a shoulder 50 keyed to shaft 46 by clutch spring 51 retained by end nut 52. Clutch spring 51 forces clutch plate 53 against spur gear 49 and spur gear 49 against shoulder 50. Spur gear 49 is driven by the reversible D. C. control rod motor 44 through pinion 55. Thus screw shaft 46 is rotated by the motor 44 through a friction clutch drive. The lower portion of shoulder 50 is provided with pinion teeth 56 engaging a driven spur gear 57 attached to the shaft of the Selsyn repeater 45.

Extending downwardly from bearing 47, is a rod casing 59 terminating in a casing block 60, which also supports an upwardly extending inner tube 61. Immediately inside of inner tube 61 is a control rod sheath 62 which extends all the way from bearing 47 to the full desired extent of control rod motion in control rod slot 40. Sheath 62 is sealed at the bottom by a welded cap 64.

The control rod proper, as above described, consists of a cadmium layer 65, sandwiched between inner and outer brass tubes 66 and 67, respectively, these tubes being attached at their upper end to a nut 69 sliding inside of rod sheath 62 and prevented from turning by a projection 70 entering aligned slots 71 in tubes 61 and 62. Nut 69 is threaded on threads 72 cut on the portion of shaft 46 below bearing 47. Thus rotation of shaft 46 will raise and lower the control rod within a watertight sheath. This watertight construction is not important when a beryllium oxide reflector is utilized, but is useful in case a liquid reflector, such as deuterium oxide (heavy water), is used.

The safety rod 76 (Figs. 1 and 2) consists of a cadmium sheet .032 inch thick, 2½ inches wide and 42 inches long, sandwiched for strength between two similar pieces of brass. In its bottom position, its lower end extends 8 inches below the center of the tank 10. Normally an electromagnet 77 holds the safety rod out of the reflector by means of a safety rod disc 79 of magnetic material attached directly to the top of the rod. Any interruption of current in the magnet, brought about either manually or by means of any of the safety circuits, later to be described, will release the rod to fall freely into the reflector by gravity. A tripping switch 80 is provided just above the top position of the magnet 77 so that if the magnet should be lifted too high, the safety rod will be dropped. In addition, upper and lower position indicator switches 81 and 82, respectively, are provided so that the "in" or "out" position of the safety rod can be made known to the operator of the reactor.

The safety rod is raised and lowered as desired by a safety rod motor 84 operating a drum 85 winding a cable 86 attached to the electromagnet 77. The safety rod motor 84 is a standard reversible motor, and is operated through circuit R which is connected to a switch 148 located in the control room. The switch 148 is a standard switch having three positions, an "off" position, an electromagnet raising position, and an electromagnet lowering position. Limit switches 89 and 90 are provided, operated by a stop on the drum 85, to limit the top and bottom respectively, of the safety rod travel. Limit switch 80 is an additional safeguard in case limit switch 89 does not operate to stop motor 84. A sliding brake 91 is provided on the safety rod to soften the blow on the structure when the rod is dropped. It may consist of two brass bars clamped to the rod with the friction adjusted by a spring. Normally, this brake is about 4 inches from the top of the rod. The rod, therefore, falls freely when released by magnet 77 until the brake 91 hits cross-frame member 25 after which the rod has to slide between the brass bars with some friction. A stop 92 is provided near the top of the structure to prevent the brake from rising all the way, and for the last 4 inches the safety rod has to slide between the brass bars, thus resetting the position of brake 91.

Certain other safeguards are attached to the system as so far described, and while their position will be indicated here, their functions will be taken up later. For example, immediately below the expanded portion 27 on the top of the upper pipe 11 are a pair of solution contact switches 95 and 96, switch 95 being slightly lower than switch 96. These switches are used to monitor the upper level of solution in the reactor system. Such switches ground a central electrode to the system through the solution, which is electrically conductive. A lower level indicator switch 97 of similar type is provided on lower pipe 12 just above the top of conical pan 15. The top of pan 15 is provided with a pan air supply line 99 and an electrically operated air release valve 100, and a level indicator 101. Pan 15 is also provided with a pan thermocouple 102 for determining the temperature of the liquid in the pan 15.

Neutron monitoring ionization chambers are also provided. A pair of BF₃ ionization chambers 105 and 106 (Fig. 2) are provided outside of the reflector 35 and positioned behind a lead shield 107 where the chambers will still receive a sufficient neutron density during operation of the reactor to give proper monitoring of the neutron reactivity. An additional ionization chamber 109 (Fig. 1) is provided adjacent pan 15 to monitor the radiation activity of the liquid in this pan.

The liquid handling system as shown in Fig. 7, will next be referred to. Inasmuch as one preferred solution to be used in the reactor is a uranyl sulphate solution in ordinary water, with the uranium 235 content of the uranium much higher than in natural uranium, it is important that evaporation from the solution be controlled so that the solution being handled may remain substantially constant in concentration during use and therefore is being separated from the operating air. To attain this result, and to fill reactor tank 10, a source of compressed air is provided, arriving through air pipe 110 under the control of system inlet valve 111 and balloon filling valve 112 (Fig. 7). Between the two valves a supply pipe 114 leads to an air reservoir 115. Attached to pipe 114 is an air pressure gauge 116, and an electrically operated air dump valve 117. In the interior of air reservoir 115 are positioned flexible balloons 119 connected to pan air supply pipe 99 (Fig. 1) line and to a manometer 121 having a liquid level indicator switch 122 therein. It is preferred that valves 111 and 112, air pressure gauge 116, air dump valve 117 and manometer 121 be positioned within a control room, as indicated by enclosure line 125. All air lines are of 5/16 O. D. copper. Valve handle 20 is also extended to this room.

It can be seen from the air line circuit so far described, that air pressure can be applied to the top of a solution positioned in pan 15 through the medium of the balloons 119, and that the system and balloons can be originally charged with air through valve 112.

At the top of the system, overflow pipe 30 (Fig. 7) leads to an overflow tank 126, in the bottom of which is positioned a liquid indicator switch 127. Air from overflow tank 126 passes through air line 128 to outlet balloon 129 prevented from collapse by internal umbrella frame 130, thus sealing the system from the outside air. Thus by applying air pressure to the solution in pan 15, this solution can be forced upwardly through pipe 12 into the reaction tank 10 and beyond tank 10 into upper pipe 11.

The operation of the reactor will be described after the electrical monitor system has been described, as shown in Fig. 8, which is highly diagrammatic and reduced to lowest terms. The right hand side of the diagram shows the instruments in the control room, the left hand side indicates the circuit. The letters denote the continuity of the circuits with those shown in other figures.

The three BF₃ ionization chambers, i. e., chambers 105 and 106, placed adjacent the reactor, see Figure 2, and the chamber 109 placed adjacent the pan 15, see Figure 1, energize D. C. amplifiers 135, 136 and 139 respectively. The outputs from these amplifiers operate respective monitoring galvanometers 135a, 136a, and 139a, to indicate radiation values. The output circuit from these amplifiers 135 and 136 also pass through tripping circuit relays as indicated by numeral 140. The tripping impulse, carried on trip line 141, operates a relay in a safety rod magnet power supply indicated by numeral 142, to break current carried in electromagnet circuit A, connected to electromagnet 77 holding up the safety rod 76. The safety rod magnet power supply 142 can also be interrupted by a hand switch 144, and by the upper safety rod limit switch 80 through circuit B. The tripping impulse from the tripping circuit 140 also is passed through a time delay relay (about 2 seconds delay) indicated by numeral 145, the impulse then travelling along line 146 to operate a solenoid air release circuit indicated by numeral 147, the output of which is carried by circuit C, to the electrically operated air release valve 117, which is in the control room. The solenoid air release circuit 147 opening air release valve 117, is also operated by overflow contact switch 127 (Fig. 7) through circuit D; by leak detector wire 36 through circuit E (Fig. 1); and by upper liquid level switch 96, through circuit F (Figs. 1 and 7). It will be noted in this respect that the overflow contact switch 127 backs up upper level switch 96 as a safeguard in case switch 96 may not operate properly, as, for example, when the solution is blown over into overflow tank 126 by an air bubble, etc.

The control rod motor 44 is operated by in and out switch 150 through circuit G and Selsyn 45 drives a control rod depth indicator 151 in the control room through circuit H.

The various thermocouples such as, for example, thermocouples 37 and 102 operate temperature indicators 152 and 154 respectively, in the control room through circuits I and J respectively. Further, in order to ensure emergency release of the air pressure in the system, in case valve 117 does not operate properly, the electrically operated valve 100 on top of pan 15 can be opened by opening manual emergency switch 155. Normally the valve 100 is held closed by power from the mains through circuit K, but upon failure of power in the mains the valve is kept closed by a separate D. C. source 156.

All other safety circuits are arranged to operate upon power failure in the mains.

Safety rod position indicating switches 82 and 81 operate respective in and out lights 157 and 159 in the control room through circuits L and M, respectively. Pan level switch 101 operates indicator 160 in the control room through circuit N. The liquid level indicator switch 122 in manometer 121 (Fig. 7) operates lamp 161 through circuit O, and the high and low solution levels in the system are indicated by lamp 162, operated by solution switch 95 through circuit P for the high position, and by lamp 164 operated from solution switch 97 through circuit Q for the low position. Solution position indicating switches 95, 96, 97 and 101 are operated with circuits normally open to prevent electrolysis of the solution and are checked by push buttons.

Having thus described the reactor and the control and safety systems, the liquid handling system and the electrical monitoring and operating system, the operation of the device will be described considering first that the reactive composition to be used in the reactor is a uranyl sulphate solution having a sufficient uranium 235 concentration to cause the system to be chain reacting when it has filled the 12 inch sphere. This uranyl sulphate solution is to be stored in pan 15 and level switch 101 will detect solution level 124, see Figure 7, thereby indicating if there is sufficient solution in the pan to fill the reactor tank 10 and pipes. To describe the process of filling the reactor tank and initiating the reaction, reference is made to Fig. 7. The control and safety rods are fully inserted. Then the balloons 119 are filled by use of the valve 112 which is then closed. Air pressure is then admitted to air reservoir 115 through valve 111, compressing the air in baloons 119, causing the pressure to be transferred to the top of the solution in the pan 15. The solution then is forced upwardly in pipe 12, into reactor tank 10 and then into upper pipe 11. The progress of the rise of the solution through the system may be checked by watching manometer 121 which is calibrated to give a rough position of the liquid level as it is rising. This manometer can also be used to detect air leaks in the system. The upper solution switch 95, mounted on upper pipe 11, indicates when the solution reaches that level, which is the normal operating level of the solution in the system.

It will be noted that the solution will stay at this level only if electromagnetic air release valves 117 and 100 remain closed. If either of these valves are opened, the air pressure on the solution is released and this release will permit the solution to flow back into conical pan 15, and out of the tank 10, by gravity. It will be noted from Fig. 8 that the solution will be dumped by operation of valve 117 through circuit C, when any one of a number of things happen. First, if the solution level rises beyond upper solution level switch 96, second if there is an overflow into overflow tank 126, and third, if there is a leak in the tank itself, such as would saturate the nylon covering of the wire 36 wound around the reaction tank. Furthermore, valve 117 will also be operated two seconds after the tripping circuit 140 has created an impulse to drop the safety rod. The delay in this case is to prevent the solution from being dumped if the entrance of the safety rod into the reflector properly stops a rise in neutron density, as would be indicated by either of the ionization chambers 105 or 106. If the safety rod does not stop the rise in neutron density after 2 seconds, the solution is then automatically dumped out of the sphere. Finally, if none of these automatic precautions operate, the manual emergency dump circuit K can be operated to release the air through the solenoid operated air valve 100. This last operation is only used as a final emergency procedure, as fresh air must then be supplied to the entire system. All dumping circuits except the emergency circuit K are arranged so that if power supply fails, solenoid valve 117 will open.

As final precaution, if the solution is too highly radioactive as indicated by ionization chamber 109, and galvanometer 139a, the conical pan 15 itself can be dumped by use of the manually operated valve handle 20, preferably extended to the control room so that the solution can be conducted outside the operating room into storage tank 22. The cadmium baffles 24, being strong neutron absorbers, effectively prevent any possibility of the chain reaction taking place in tank 22.

A discussion of some of the nuclear aspects of the system will be given prior to describing the start-up of the operation of the device.

While the entire volume of the solution is normally stored in conical tank 15, no chain reaction will take place therein for several reasons. First, the sphere is the most efficient shape for a neutronic reactor, whereas the conical shape is not. Second, neutronic reactors of small size have an extremely high neutron leakage factor. When a reflector is used around tank 10, critical mass can be obtained with a lower concentration of uranium 235, because the reflector returns neutrons to the solution and very effectively reduces the amount of uranium 235 required in the tank 10 to cause the chain reaction to be attained. Since conical pan 15 has no reflector, most of the escaping neutrons are lost and do not return. In consequence, no chain reaction takes place in pan 15.

However, the solution in pan 15 can become highly radiative after operation of the device as a neutronic reactor, due to the accumulation of radioactive fission products therein. Ionization chamber 109 is used to monitor this radioactivity and if it becomes too high, the solution may have to be drained into storage tank 22 until the radioactivity decays to a safe handling value. Alternatively an auxiliary tank may be provided as a substitute for tank 15.

Other features should be pointed out. It will be noted that neither the safety rod nor the control rod enter the reactor tank 10. Small reactors such as shown and described herein have such high neutron leakage that they usually are not of critical size without a reflector and are dependent for proper operation for a given size, concentration and shape, on the efficient action of the reflector. In such a small reactor the insertion of neutron absorbers even in the reflector outside of the reactor tank will prevent the reflector from returning sufficient neutrons to keep the chain reaction sustained with the reactor having a mass that would be critical if it were not for the absorption in the reflector. This affords a very simple and effective method of control without insertion of neutron absorbers into the reacting portion of the reactor.

Of the uranium salts, $UO_2SO_4$ is preferred for use in the reactor instead of, for example, uranyl nitrate, first, because there is less unwanted neutron absorption with the suphate than there is with the nitrate, and, second, the sulphate is more soluble in water than the nitrate. Furthermore, 18–8 stainless steel has showed extremely low corrosion rates after being in contact with $UO_2SO_4$ solutions from 1 to 2 weeks. Consequently, all portions of the system which are to come into contact with $UO_2SO_4$ are pickled with normal 3 M $UO_2SO_4$ solution for from 1 to 3 weeks before starting operations.

In starting up the device for the first time, a sufficient amount of distilled water is placed in conical pan 15 to properly fill the reactor tank and its attached pipes to the proper operating level as indicated by solution switch 95. Uranyl sulphate containing isotope uranium 235 to the point where the average computation of the material is about 14.7 percent uranium 235, as indicated by mass spectrometer analysis, is added to 1 or 2 liters of the water withdrawn from the conical reservoir, and dissolved therein. The resulting solution is replaced in the tank 15 and stirred as, for example, with an electric mixer, through a cap to prevent evaporation of the water. The solution is then run up and down in the reactor tank 10 several times, while the control rods are in, to improve the mixing. When the neutron counting rate, as indicated by monitoring counters 105 and 106 does not change with each successive filling of the tank 10, the solution is adequately mixed. This method of adding the salt increases the total volume of the solution at each step, and to avoid accumulation of too much excess solution, some of the solution is removed during the addition, evaporated, and the recovered $UO_2SO_4$ made ready for further use.

To establish a chain reaction uranyl sulphate is added in the manner described, until critical conditions are reached, i. e., where the neutron reproduction ratio in the reactor tank equals unity. With the 12 inch reactor tank, critical conditions are obtained with about 570 grams of uranium 235.

Figure 11:
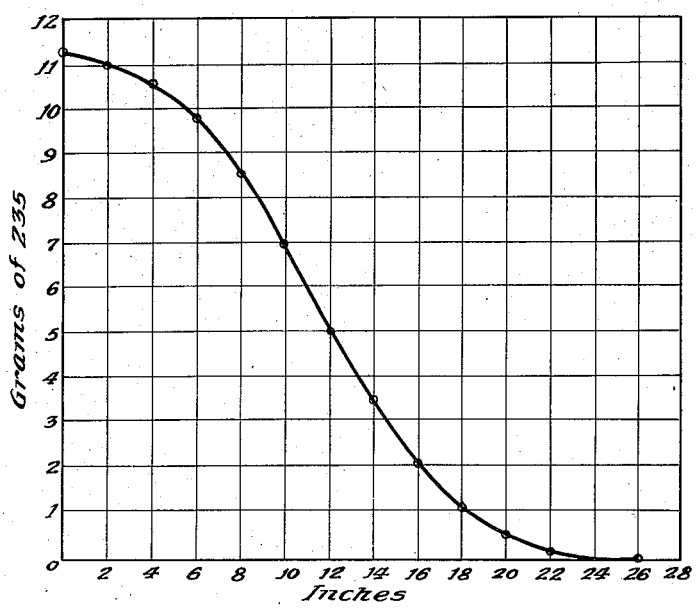
Fig. 11 is a chart or graph showing the relation between the added amount of uranium 235 and the depth of insertion of the control rod.
Figure 12:
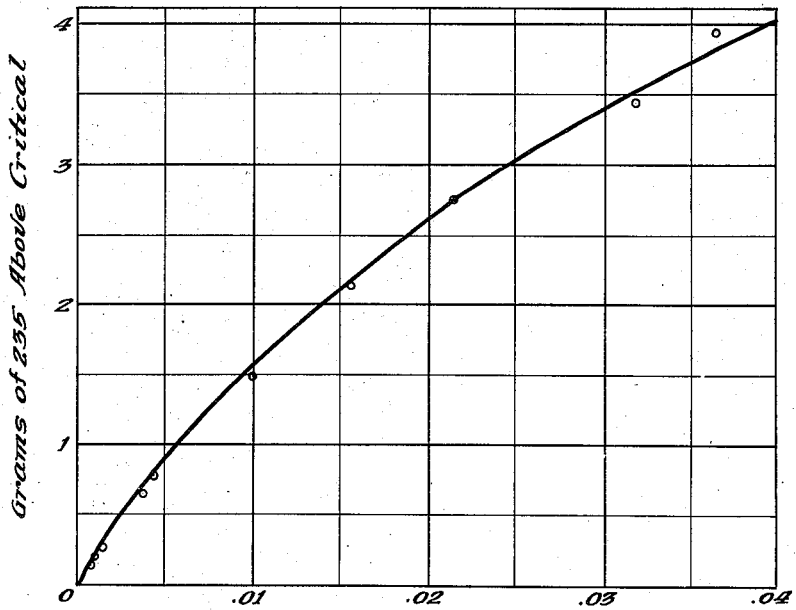
Fig. 12 is a chart or graph showing the effect of added uranium 235 on the reciprocal period.

With the cadmium control rod partly in, some uranium 235, such as approximately 1.8 grams, is removed from the reactor tank so that the control rod is for practical purposes in its full out position with critical conditions prevailing. The control rod is then calibrated in terms of mass of uranium 235 in the reactor tank by adding uranium 235 (as $UO_2SO_4$) and determining the new critical position of the control rod, i. e., the position where the neutron reproduction ratio is unity. Fig. 11 shows a graph of the equivalent mass of uranium 235 in grams as the function of the control rod position in the reactor system. The control rod in this case is all the way in at 0 inch. The mass of uranium 235 in the reactor tank can then be regulated to give critical conditions at some intermediate position so that the control rod can be moved in or out of the reflector to provide shutdown of reactivity, or super criticality where the neutron reproduction ratio will be over unity, respectively, as desired. Figure 12 shows the effect on the reciprocal period of adding uranium 235 after critical conditions have been attained.

Because of the large coefficient of expansion of water, several of the pertinent constants such as, for example, the age of the neutrons and the thermal diffusion length (previously defined) depend on the temperature. A very noticeable change in external leakage and consequently, in critical position of the control rod, will take place if the temperature changes even a few degrees. This temperature effect in the presently described reactor is 7.3 grams equivalent of uranium 235 per degree C.

For this reason, it is desirable to keep the reactor at a substantially constant temperature while operating.

One manner by which the temperature may be stabilized is to enclose the reactor in a well insulated room and maintain the room at an elevated temperature, such as, for example, 39° C.

Figure 10:
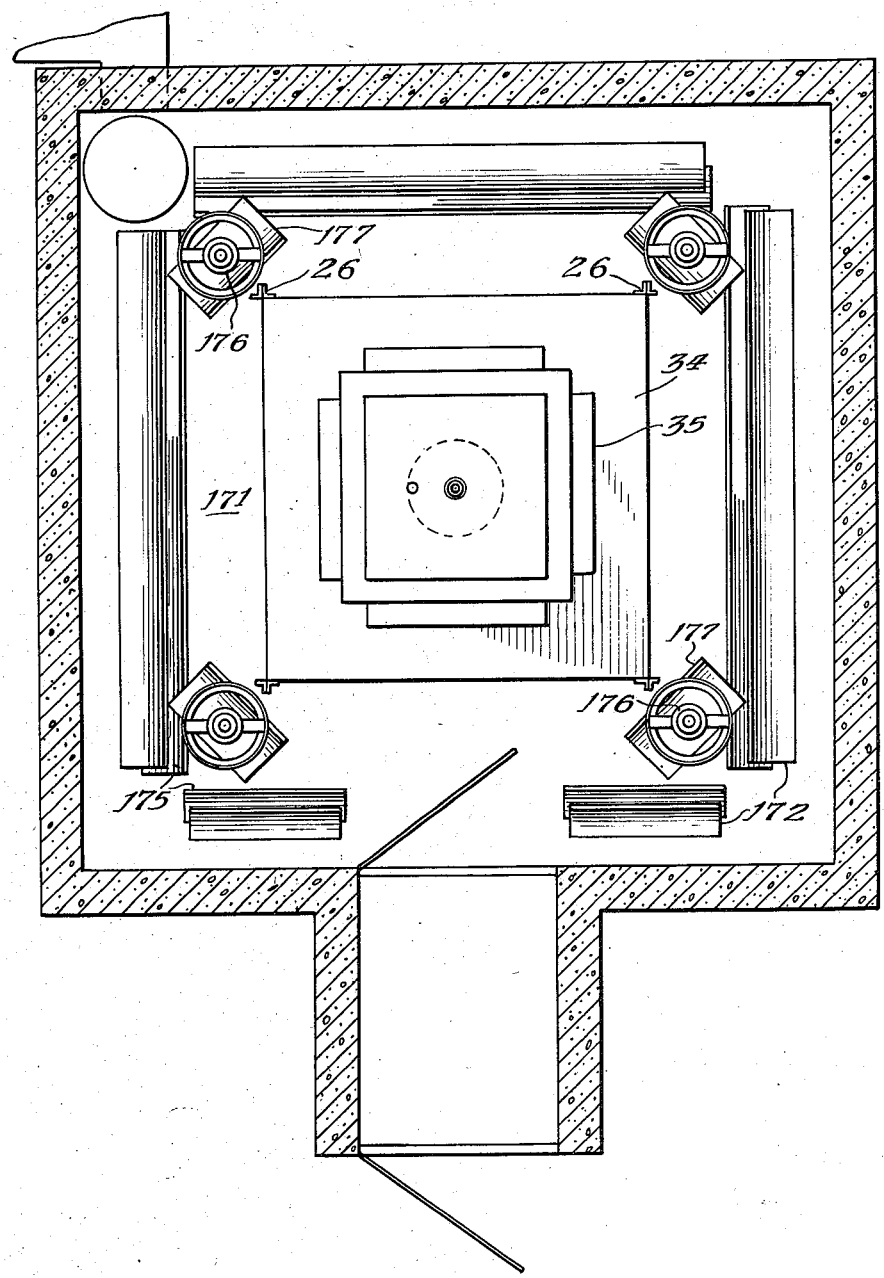
Fig. 10 is a diagrammatic view partly in top plan and partly in section of the reactor room.

A satisfactory enclosure is shown in Figs. 9 and 10 showing the approximate size and location of the equipment therein. A room is formed from heat insulating walls 170 to enclose a space 171 about 12' x 12' x 12½'. The enclosure is maintained at the elevated temperature of 39° C. by heaters 172 under the control of electronic circuits operated by thermocouples such as, for example, thermocouple junctions registering the difference in temperature between points in contact with the tank 10 and a reference temperature as measured with a platinum resistance thermometer in an aluminum cylinder 174 attached to upper pipe 11 above the reflector. One junction of each thermocouple is also imbedded in the same cylinder 174. Tests have shown that thermocouples positioned on the outside of tank 10 will give a good measure of the solution inside.

Temperature gradients within the room are controlled by heater baffles 175, and good mixing of the air is obtained by the use of air circulating fans 176 provided with fan baffles 177. In this manner it is possible to maintain the temperature of the solution and its surroundings uniform to within a few hundredths of a degree C., and constant for many hours to within one hundredth of a degree C.

The reactor is then in condition to be operated at a low power level, such as, for example, 1 watt. To obtain a desired power level after critical mass is obtained with the control rod partly in, the control rod is retracted, so that the reactor is super critical. An exponential rise in neutron density then occurs, at a rate determined by the amount of removal of the control rod. With the control rod just slightly removed from the critical position single doubling of the neutron density can be obtained in days or hours, if desired. Further removal of the rod will, of course, increase the rate of neutron density rise. When the desired power level is reached, the rod is returned to position where the reproduction ratio is again unity. With the temperature stabilized, only minor movements of the control rod will be needed to maintain the desired power level.

The reactor described is useful as a source of neutrons, and materials to be irradiated can be placed in a reentrant tube extending downwardly into reactor tank 10 through pipe 11 from expanded portion 27 by removing cap 29. Another of the main uses of the device described is for the determination of the neutronic behavior of solutions containing large amounts of uranium 235 under various temperatures and concentrations, while undergoing a self-sustaining chain reaction by nuclear fission.

Figure 13:
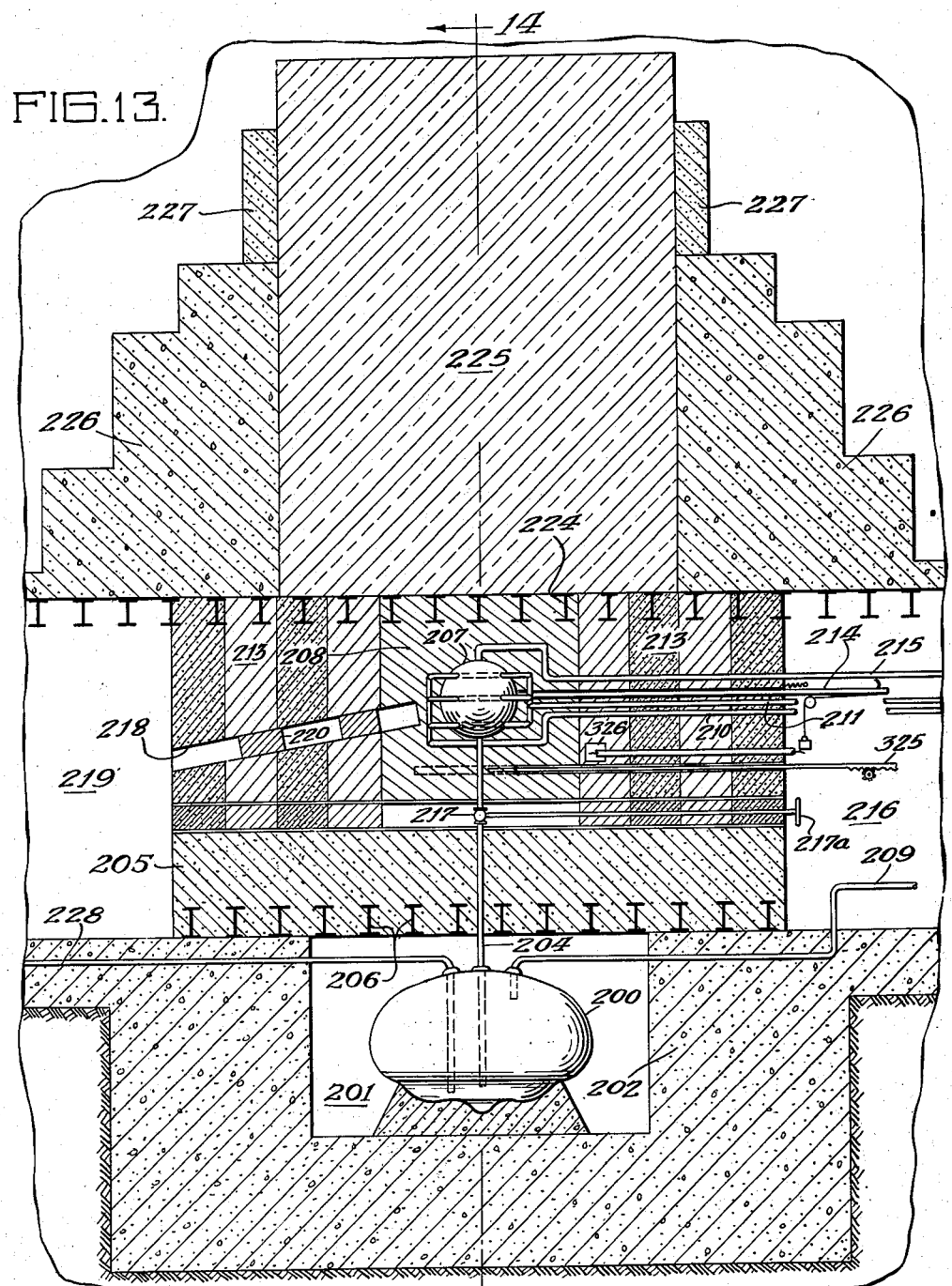
Fig. 13 is a vertical sectional view of a uranium 235 solution reactor capable of operating continuously at substantial power for example 10 kw.
Figure 14:
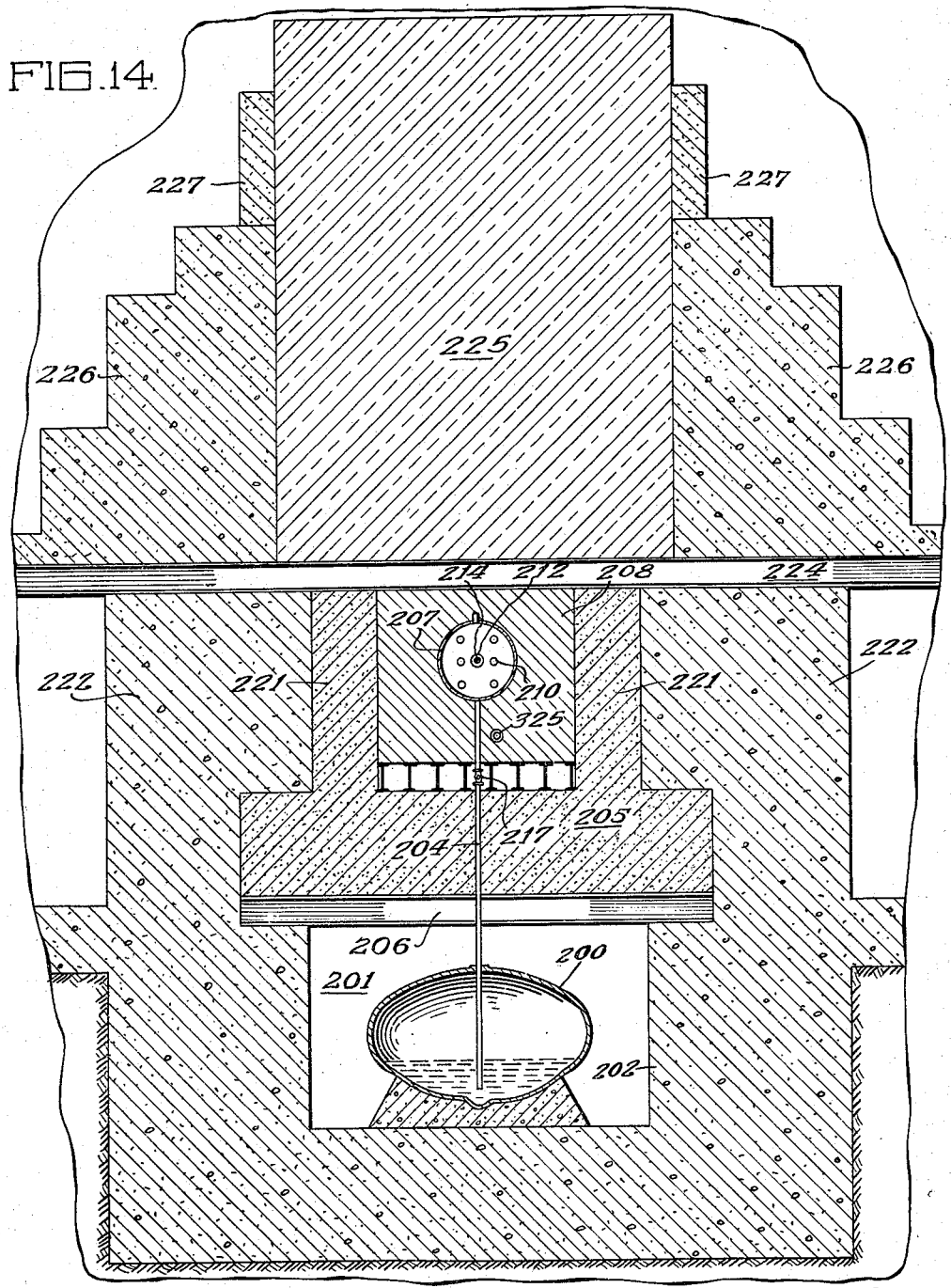
Fig. 14 is a vertical sectional view of the device of Fig. 13 taken in a plane at a right angle to the plane of the section in Fig. 13.

Figs. 13 and 14 inclusive show a similar type of reactor having as a primary function the generation of both slow and fast neutrons by means of a chain fission reaction.

Referring to these figures, the reactive solution may be stored in storage tank 200 positioned in tank chamber 201 surrounded by concrete walls 202 below ground. Storage tank 200 is larger than the reactor tank to be used, and thus the solution occupies only the lower portion of the tank, and is of unfavorable shape for the chain reaction. This fact, together with the fact that no reflector is used around tank 200, effectively prevents the chain reaction from taking place therein.

The solution stored in tank 200 is pushed upwardly through solution pipe 204 passing through a lead base 205 supported on base beams 206, into a spherical reactor tank 207, 12 inches in diameter, surrounded by a cubical beryllium oxide reflector 208 three feet on a side, by air pressure in pipe 209 as in the first embodiment described. Horizontal inlet cooling water tubes 210 are extended around the reactor tank 207 and then pass through the tank 207 to emerge as outlet water tube 211. In the center of reactor tank 207 is a horizontal scabbard tube 212 (Fig. 14) into which a horizontal safety rod 214 enters. A vent pipe 215 extends from the top of the reactor tank 207 outwardly parallel with inlet and outlet tubes 210 and 211, respectively. Tubes 210 and 211, safety rod 214, and vent pipe 215 all pass through a thick alternate layer paraffin-bismuth shield 213 into a control room space 216. The solution can be dumped from reactor tank 207 by operation of valve 217, having an operating rod 217a extending into the control room space.

The opposite vertical face of reflector 208 is also provided with a thick alternate layer paraffin-bismuth shield 213 (Fig. 13) pierced by a fast neutron bore 218, entering reflector 208 adjacent reactor tank 207 and opening into a space or room 219 wherein the fast neutrons may be utilized. The fast neutron bore may be provided with bismuth filters 220, which pass past neutrons but offer gamma ray shielding. Suitable means (not shown) may be provided to close off the bore if desired when the fast neutrons emanating therefrom are not in use.

The other two vertical faces of reflector 208 (Fig. 14) are enclosed, first by inner vertical lead shields 221 and then by concrete walls 222. These walls 222 support column beams 224 extending across the top of the reflector at approximately ground level.

Erected on column beams 224 and centered over the top of reflector 208 is a thermal neutron column 225 formed from graphite blocks of high neutronic purity. This thermal neutron column is preferably wider than reflector 208 and is surrounded at its basal portion by concrete blocks 226, and near the top portion by a lead shield 227. The upper face of the thermal neutron column is flat, and upon this face may be placed materials or structures it is desired to expose to the action of the thermal neutrons. Thus the thermal neutrons can be utilized on the top of the thermal neutron column, and the fast neutrons utilized after emerging from fast neutron bore 218.

Control is effected by a control rod 325 operating horizontally from the control room 216 and entering the reflector 208 beneath the reactor tank 207. Monitoring of the reaction is by ionization chamber 326 and appropriate indicator in the control room. Safety and check circuits may be similar to those described for the embodiment previously described.

The operation of the embodiment just described is similar to that of the device first described, except that due to the coolant entering the reactor, it can operate continuously at a power output of 10 kw. with a substantially uniform temperature. A power of 10 kw. can be obtained in a tank 12 inches in diameter and containing about 670 grams of uranium 235 in the form of $UO_2SO_4$. This is about 100 grams more than is used in the previously described embodiment, and the extra uranium 235 is used in the present embodiment to compensate for the neutron absorption in the coolant tubes and safety rod sheath.

At the rated power of 10 kw. a flux of about $10^9$ slow neutrons per cm.$^2$ per second will be available on the surface of the thermal column 225, and a flux of about $10^5$ fast neutrons per cm.$^2$ per second will emerge from the fast neutron bore 218, both for use as desired.

In addition, solution from storage tank 200 can be withdrawn and replaced through shielded pipe 228, and radioactive fission products removed, or uranium 235 added, etc., as desired. A powerful and compact neutron source has thus been provided.

While the embodiments above described have used uranium 235 as the fissionable isotope, it has been pointed out above that plutonium 239 and uranium 233 can also be used.

It has been found that a chain reaction can be established using a suspension or dispersion of at least about $10^{-2}$ grams of a fissionable isotope such as plutonium 239, uranium 233 or uranium 235 per cubic centimeter of aqueous dispersion using ordinary water. The limiting minimum concentration is dependent to a substantial degree upon the moderator and even where the moderator has negligible neutron absorption as is the case with $D_2O$ the concentration must be at least $10^{-4}$ grams of plutonium or other fissionable isotope per cc. of solution. Above these minimums a substantial range of concentration is permissible and this concentration may be as high as about 8–10 grams of uranium per cc. of dispersion. However, it is rare that concentrations much above about 2 grams of fissionable isotope per cc. of solution are used. Preferably the dispersion should be a true solution which is substantially free from undissolved suspended fissionable solids since control of the reaction is much easier in such a case.

In order to control the reaction without excessive effort it generally is preferred to maintain the solution or suspension at a substantially constant concentration. While some variation is permissible, wide variation in concentration while the reaction proceeds makes control of the chain reaction difficult.

The amount of fissionable isotope which should be present in order to establish a self-sustaining neutron chain reaction depends to a substantial degree upon the concentration of the fissionable isotope in the moderator and also upon the neutron absorption characteristic of the moderator used. In general it can be said that the amount of uranium 235 present should be at least about 300 grams with optimum concentration and using either pure uranium 235 or uranium concentrates containing 5 to 10 percent or more of uranium 235. The exact amount required will also depend upon the fissionable isotope which is used. For example, it has been found that when plutonium 239 is used as the fissionable isotope only about two-thirds of the weight of isotope required for uranium 235 is necessary.

The following tables indicate generally the trend. Table I tabulates the quantities and critical size required for a spherical reactor containing uranyl sulphate dissolved in water, when the reactor is provided with an infinite $D_2O$ reflector and when the uranium is enriched to contain 12.5 percent by weight of uranium 235 the balance being uranium 238. In the table $z$ denotes the number of atoms of uranium 235 present per molecule of $H_2O$. $C$ denotes the concentration in percent by weight of uranyl sulphate. $d$ denotes the density of the mixture. $r$ denotes the radius of the sphere in centimeters and $G$ denotes the critical quantity of 235 required in grams.

Table I

| Z | C | $d$, gm./cm.$^3$ | $r$, cm. | $G$, gm. |
|---|---|---|---|---|
| $1\times10^{-3}$ | 2.0 | 1.018 | 85 | 32,770 |
| $1.5\times10^{-3}$ | 3.0 | 1.026 | 26.8 | 1,524 |
| $2.0\times10^{-3}$ | 3.9 | 1.034 | 20.1 | 848 |
| $2.4\times10^{-3}$ | 4.7 | 1.040 | 17.9 | 712 |
| $2.8\times10^{-3}$ | 5.4 | 1.048 | 16.3 | 622 |
| $3.2\times10^{-3}$ | 6.1 | 1.054 | 15.3 | 582 |
| $3.6\times10^{-3}$ | 6.8 | 1.062 | 14.6 | 564 |
| $4.0\times10^{-3}$ | 7.5 | 1.068 | 14.0 | 548 |
| $5.0\times10^{-3}$ | 9.3 | 1.086 | 13.0 | 537 |
| $6.0\times10^{-3}$ | 10.9 | 1.102 | 12.4 | 547 |
| $10\times10^{-3}$ | 16.9 | 1.170 | 11.0 | 587 |

From the above table it will be apparent that as the concentration of uranium 235 in a solution increases from $1\times10^{-3}$ atoms of the uranium 235 per molecule of $H_2O$ the critical radius of the reaction decreases and the critical mass of 235 decreases to a minimum somewhat over 500 grams and thereafter the critical mass increases with increasing concentration.

Figure 15:
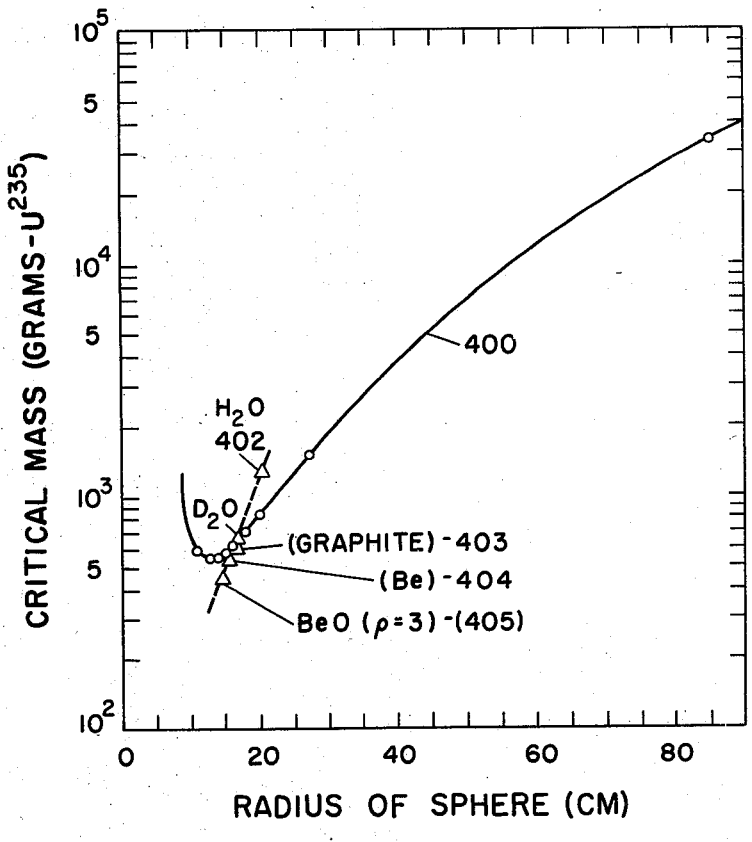
Figure 15 is a graph showing the relation between the critical mass in grams of $U^{235}$ as a function of the radius of a sphere in accordance with Tables I and III; and, Figure 16 is a graph showing the concentration in atoms of $U^{235}$ per molecule of water as a function of the radius of a sphere in accordance with Tables I and III.

Figure 15 shows the variation of the critical mass ($G$) as a function of the radius of the sphere ($r$) shown in Table I. Thus the curve 400 of Figure 15 shows that the critical mass for the 12.5 percent by weight enriched uranium decreases with decreasing sphere radius, reaching a minimum at about 13 cm., and increases rapidly with radii of less than 13 cm.

Figure 16 is a plot of the concentration of atoms of $U^{235}$ per molecule of water (col. Z—Table I) as a function of the radius of the sphere (col. $r$—Table I) and shows that a minimum concentration for large radii of about $1\times10^{-3}$ atoms of $U^{235}$ is required. This concentration increases rapidly as is apparent from curve 401 at the lower sphere radii values and becomes essentially a vertical line at a sphere radius of about 10 cm.

Where a neutron moderator which has less tendency than water to absorb neutrons is used, the critical mass for a chain reaction may be substantially smaller. The following table tabulates the critical mass which is required for various concentrations of a uranyl-plutonyl sulphate solution in $D_2O$ using an infinite $D_2O$ reflector. The concentration of plutonium was 12.5 percent based upon the total weight of uranium and plutonium. In the table Z and G are as defined above. $V_x$ is the critical volume in liters.

Table II

| $Z\times10^{-3}$ | 0.1 | 0.2 | 0.25 | 0.3 | 0.5 | 1.0 | 2.0 |
|---|---|---|---|---|---|---|---|
| $V_x$, Liter | 180 | 80 | 62 | 51 | 32 | 18 | 11 |
| $G$, gm | 290 | 210 | 205 | 205 | 210 | 240 | 290 |

From the above Table II it is shown that a minimum critical mass as low as about 200 grams of plutonium 239 is capable of sustaining a reaction in a $D_2O$ moderator with an infinite $D_2O$ reflector. Not less than about 300 grams of uranium 235 would be required were uranium 235 to be substituted for the plutonium in the above solution.

The variation in critical mass which is required to sustain a neutron chain reaction depends to a very substantial degree upon the nature and thickness of the neutron reflector. The following table tabulates data which have been computed respecting the critical radius required to establish a neutron chain reaction in an aqueous solution containing $2.8\times10^{-3}$ atoms of uranium 235 per molecule of water in the form of a uranyl sulphate solution in which the uranium contains 12.5 percent uranium 235 using various reflectors infinite in size.

Table III

| Reflector | Graphite | D₂O | H₂O | BeO P=3 | BeO P=2 | Be | None |
|---|---|---|---|---|---|---|---|
| R | 16.1 | 16.3 | 20.7 | 14.7 | 16.3 | 15.5 | 27.3 |
| G | 600 | 622 | 1,273 | 456 | 622 | 535 | 2,920 |

From the above Table III it will be apparent that H₂O is a somewhat poorer reflector than graphite, D₂O beryllium, or beryllium oxide. It will be noted from the above table that the actual density of the neutron reflector has some bearing upon the reflecting character of the material as shown by the fact that a substantially smaller critical mass is required where beryllium oxide is compacted to a density of 3 than where this oxide has a density of 2.

The values for the various reflectors shown in Table III are plotted in Figure 15 to show the relative effectiveness of the individual reflectors with respect to the curve 400 which is for the D₂O reflected spherical case. Point 402 is for the ordinary water reflected sphere and shows that water is not as good a reflector as heavy water. Point 403 is for the graphite reflected sphere and shows that graphite is essentially the same in reflective effectiveness as heavy water. Point 404 is for the beryllium reflector case and shows that this reflector is more effective than graphite, D₂O, or H₂O. Point 405 is for the beryllium oxide reflected case with the density equal to 3 and show that this is the most effective reflector of all those shown in Table III. It is also apparent from Table III that a beryllium oxide reflector with a density of 2 has about the same effectiveness as the heavy water reflector.

Figure 16 shows the points of Table III, all of which have a concentration of $2.8 \times 10^{-3}$ atoms of $U^{235}$ per molecule of water in relation to curve 401 which is the heavy water reflected case. It is apparent from Figure 16 that the more effective reflectors, such as beryllium oxide of density 3, have the effect of reducing the sphere radius required as the concentration of $U^{235}$ is maintained. It is also apparent that if a stock solution is prepared having $2.8 \times 10^{-3}$ atoms $U^{235}$ per molecule of water various size spheres can be made critical, dependent upon the particular reflector selected. Thus if ordinary water is used as a reflector at this concentration, the radius would necessarily be 20.7 cm., whereas with the same solution and a beryllium oxide reflector of density 3 a 14.7 cm. radius sphere could be made critical.

From the above data it will be apparent that no hard and fast figure for critical mass may be given since the mass will vary with the nature of the moderator, nature of the fissionable isotope, concentration in moderator, nature and depth of reflector as well as concentration of impurities including uranium 238 and thorium 232. Generally speaking, however, not less than about 200 grams of the fissionable isotope is required using the best of moderators and securing maximum neutron reflection at optimum concentration. Where ordinary water is used not less than about 300 grams of fissionable isotope will be required and where the fissionable isotope is uranium 235 the minimum concentration for the best available moderator will be at least about 300 grams and for water it will be at least about 500 grams. These concentrations must be increased with increasing concentration of impurities including coolant or other neutron absorbing agent and also with variation in the concentration and neutron reflection of the system. Moreover the actual amount used in a reactor is somewhat higher since the reactor generally is desired to be larger than critical size.

The reactors herein contemplated are operative when using pure fissionable isotopes such as pure uranium 233, pure plutonium 239 etc. However, such purity is not necessary and frequently it is desirable to conduct the reaction in the presence of an isotope capable of absorbing neutrons to yield a further quantity fissionable isotope as the reaction proceeds. Thus uranium containing uranium 238 in concentrations for example about 5 to 99 percent the balance being uranium 235 offers certain advantages since uranium 238 is converted to plutonium 239 which aids uranium 235 to support the reaction. The same is true when thorium 232 is used in lieu of uranium 238, as uranium 233 is found during the reaction.

From the above description it can be seen that fissionable isotopes when used in higher concentrations in a moderator than are obtainable naturally, can be employed to create a self-sustaining chain reaction in a very small reactor, the amounts of fissionable isotope necessary being of the order of less than a kilogram.

Although the present invention has been described with reference to the specific details of certain embodiments thereof it is not intended that such details shall be regarded as limitations upon the scope of the invention except insofar as included in the accompanying claims.

What is claimed is:

1. A neutronic reactor comprising a vessel having all dimensions from its center to its wall of about 6 inches, a liquid, said vessel substantially filled with said liquid, said liquid comprising an ordinary water solution of a soluble salt of uranium, said uranium having at least about one percent by weight of the fissionable isotope $U^{235}$, said solution having a concentration of greater than about $10^{-3}$ atoms of said fissionable isotope per molecule of water, the quantity of fissionable isotope in solution being in excess of about 500 grams and sufficient to provide a critical mass in said vessel, and a neutron reflector substantially surrounding said vessel.

2. A neutronic reactor comprising a vessel having all dimensions from its center to its wall of about 6 inches, a liquid, said vessel substantially filled with said liquid, said liquid comprising an ordinary water solution of soluble salt of uranium, said uranium having at least about one percent by weight of the fissionable isotope $U^{235}$, said solution having a concentration of greater than about $10^{-3}$ atoms of said fissionable isotope per molecule of water, the quantity of fissionable istopoe in solution being in excess of abut 500 grams and sufficient to provide a critical mass in said vessel, a neutron reflector substantially surrounding said vessel, means for monitoring the neutron flux level proximate said vessel, a safety rod including neutron absorbing material, and means responsive to a predetermined neutron flux level in said monitoring means for moving said neutron absorbing material into the proximity of said vessel.

3. A neutronic reactor comprising a vessel having all dimensions from its center to its wall of about 6 inches, a liquid, said vessel substantially filled with said liquid, said liquid comprising an ordinary water solution of a soluble salt of uranium, said uranium having at least about one percent by weight of the fissionable istotope $U^{235}$, said solution having a concentration of greater molecule of water, the quantity of fissionable isotope in solution being in excess of above 500 grams and sufficient to provide a critical mass in said vessel, a neutron reflector substantially surrounding said vessel, and control means for selectively varying the number of reflected neutrons.

4. A neutronic reactor comprising a vessel having all dimensions from its center to its wall of about 6 inches, a liquid, said vessel substantially filed with said liquid, said liquid comprising an ordinary water solution of a soluble salt of uranium, said uranium having at least about one percent by weight of the fissionable isotope $U^{235}$, said solution having a concentration of greater than about $10^{-3}$ atoms of said fissionable isotope per molecule of water, the quantity of fissionable isotope in solution being in excess of about 500 grams and sufficient to provide a critical mass is said vessel, a neutron reflector substantially surrounding said vessel;

an aperture in said reflector adjacent said vessel, a control rod including a neutron absorbing material slidable in said aperture, and means for selectively positioning said control rod with respect to said vessel.

5. A neutronic reactor comprising a vessel having all dimensions from its center to its wall of about 6 inches, a liquid, said vessel substantially filled with said liquid, said liquid comprising an ordinary water solution of a soluble salt of uranium, said uranium having at least about one percent by weight of the fissionable isotope $U^{235}$, said solution having a concentration of greater than about $10^{-3}$ atoms of said fissionable isotope per molecule of water, the quantity of fissionable isotope in solution being in excess of about 500 grams and sufficient to provide a critical mass in said vessel, a neutron reflector substantially surrounding said vessel, an aperture in said reflector adjacent said vessel, a safety rod including a neutron absorbing material slidable within said aperture, said safety rod normally held in a first position by an energized electromagnet, means for monitoring the neutron flux level of said reactor, means responsive to a predetermined flux level in said monitoring means for de-energizing said electromagnet whereby said safety rod will move to a second position and absorb a portion of the reflected neutrons.

6. A neutronic reactor comprising a vessel having all dimensions from its center to its wall of about 6 inches, a liquid, said vessel substantially filled with said liquid, said liquid comprising an ordinary water solution of a soluble salt of uranium, said uranium having at least about one percent by weight of the fissionable isotope $U^{235}$, said solution having a concentration of greater than about $10^{-3}$ atoms of said fissionable isotope per molecule of water, the quantity of fissionable isotope in solution being in excess of about 500 grams and sufficient to provide a critical mass in said vessel, neutron reflector means substantially surrounding said vessel and means for removing heat from said liquid.

7. A neutronic reactor comprising a vessel having all dimensions from its center to its wall of about 6 inches, a liquid, said vessel substantially filled with said liquid, said liquid comprising an ordinary water solution of a soluble salt of uranium, said uranium having at least about one percent by weight of the fissionable isotope $U^{235}$, said solution having a concentration of greater than about $10^{-3}$ atoms of said fissionable isotope per molecule of water, the quantity of fissionable isotope in solution being in excess of about 500 grams and sufficient to provide a critical mass in said vessel, neutron reflective means substantially surrounding said vessel and means including coolant coils within said vessel and passing through said vessel wall for removing heat from said liquid.

8. In a homogeneous neutronic chain reactor having a liquid composition of fissionable material and moderator, the combination of a liquid composition handling system comprising a non-critical closed reservoir having its bottom connected to the bottom of said reactor, a collapsible gas reservoir connected to the top of said closed reservoir, fluid pressure means for varying the volume of said gas reservoir, and means for monitoring the liquid composition level in said reactor.

9. In a homogeneous neutronic chain reactor having a liquid composition of fissionable material and moderator, the combination of a liquid composition handling system comprising a non-critical closed reservoir having its bottom connected to the bottom of said reactor, a collapsible gas reservoir connected to the top of said closed reservoir, fluid pressure means for varying the volume of said gas reservoir, means for monitoring the liquid composition level in said reactor, and means responsive to said monitoring means for releasing the pressure of said fluid pressure means.

10. In a homogeneous neutronic chain reactor having a liquid composition of fissionable material and moderator, the combination of a liquid composition handling system comprising a non-critical closed reservoir having its bottom connected to the bottom of said reactor, a collapsible gas reservoir connected to the top of said closed reservoir, fluid pressure means for varying the volume of said gas reservoir, and means responsive to liquid composition leaks in said reactor for releasing the pressure of said fluid pressure means.

11. In a homogeneous neutronic chain reactor having a liquid composition of fissionable material and moderator, the combination of a liquid composition handling system comprising a non-critical closed reservoir having its bottom connected to the bottom of said reactor, a collapsible gas reservoir connected to the top of said closed reservoir, fluid pressure means for varying the volume of said gas reservoir, a liquid composition overflow tank connected to said reactor, and means responsive to the presence of said liquid composition in said tank for releasing the pressure of said fluid pressure means.

12. In a homogeneous neutronic chain reactor having a liquid composition of fissionable material and moderator, the combination of a liquid composition handling system comprising a non-critical closed reservoir having its bottom connected to the bottom of said reactor, a collapsible gas reservoir connected to the top of said closed reservoir, fluid pressure means for varying the volume of said gas reservoir, and means responsive to a predetermined neutron flux adjacent said reactor for releasing the pressure of said fluid pressure means.

13. In a homogeneous neutronic chain reactor having a liquid composition of fissionable material and moderator, the combination of a liquid composition handling system comprising a non-critical closed reservoir having its bottom connected to the bottom of said reactor, a collapsible gas reservoir connected to the top of said closed reservoir, fluid pressure means for varying the volume of said gas reservoir, and expendable means for confining gas displaced from said reactor by the influx of said liquid composition.

14. In neutronic reactor systems having a liquid composition of fissionable material and moderator, the combination of a reactor vessel, a reflector substantially surrounding said vessel, a non-critical geometry closed container located outside of said reflector, a pipe connecting the bottom of said vessel and said container and extending downwardly into said container, means for applying gas pressure through the top of said container, and fluid pressure means for controlling said gas pressure means.

15. In neutronic reactor systems having a liquid composition of fissionable material and moderator, the combination of a reactor vessel, a reflector substantially surrounding said vessel, a non-critical geometry closed container located outside of said reflector, a pipe connecting the bottom of said vessel and said container and extending downwardly into said container, means for applying gas pressure through the top of said container, fluid pressure means for controlling said gas pressure means, an overflow pipe connected to top of said vessel, an overflow chamber connected to said overflow pipe, and a sealed expandable air reservoir connected to said overflow chamber.

16. In neutronic reactor systems having a liquid composition of fissionable material and moderator, the combination of a reactor vessel, a reflector substantially surrounding said vessel, a non-critical geometry closed container located outside of said reflector, a pipe connecting the bottom of said vessel and said container and extending downwardly into said container, means for applying gas pressure through the top of said container, fluid pressure means for controlling said gas pressure means, an overflow pipe connected to the top of said vessel, an overflow chamber connected to said overflow pipe, a sealed expandable air reservoir connected to said overflow chamber, a tank located below said closed container and containing neutron absorbing material, and a dump pipe connecting said closed container and said tank.

17. In a neutronic reactor system having a liquid composition of fissionable material and a moderator, the combination of a spherical vessel, a reflector substantially surrounding said vessel, a non-critical geometry closed container located outside of said reflector, a pipe connecting the bottom of said vessel and said container and extending downwardly into said container, a closed tank, a fluid pressure inlet connected to said closed tank, means for controlling the fluid pressure in said tank, at least one collapsible chamber sealed from said fluid pressure in said tank, the interior of said collapsible chamber being connected to the top of said closed container.

18. A neutronic reactor comprising a spherical vessel having a diameter of about 12 inches, a liquid, said vessel substantially filled with said liquid, said liquid comprising a solution of ordinary water and uranium sulphate, said uranium having about 14.7 percent by weight of the fissionable isotope $U^{235}$, said solution containing a quantity of said fissionable isotope in solution of about 570 grams, and beryllium oxide as a neutron reflecting means substantially surrounding said vessel.

19. In a homogeneous nuclear reactor the combination of a spherical container having a radius of about 16.3 cm., said container enclosing a solution of uranyl sulfate and ordinary water having at least $2.8 \times 10^{-3}$ atoms of $U^{235}$ per molecule of water, said uranyl sulfate containing uranium enriched in the isotope $U^{235}$ to a value of at least about 12.5 percent, said uranium $U^{235}$ being present in a quantity of at least about 622 grams, said container being substantially surrounded by a $D_2O$ reflector.

20. In a homogeneous nuclear reactor the combination of a spherical container having a radius of about 16.1 cm., said container enclosing a solution of uranyl sulfate and ordinary water having at least $2.8 \times 10^{-3}$ atoms of $U^{235}$ per molecule of water, said uranyl sulfate containing uranium enriched in the isotope $U^{235}$ to a value of at least about 12.5 percent, said uranium $U^{235}$ being present in a quantity of at least about 600 grams, said container being substantially surrounded by a graphite reflector.

21. In a homogeneous nuclear reactor the combination of a spherical container having a radius of about 20.7 cm., said container enclosing a solution of uranyl sulfate and ordinary water having at least $2.8 \times 10^{-3}$ atoms of $U^{235}$ per molecule of water, said uranyl sulfate containing uranium enriched in the isotope $U^{235}$ to a value of at least about 12.5 percent, said $U^{235}$ being present in a quantity of at least about 1273 grams, said container being substantially surrounded by an ordinary water reflector.

22. A neutronic reactor utilizing liquid fuel comprising a spherical vessel, said vessel substantially filled with said liquid, said liquid comprising an ordinary water solution of a soluble salt of uranium, said uranium having at least about 12.5 percent by weight of the fissionable isotope $U^{235}$, said solution having a concentration of greater than $10^{-3}$ atoms of $U^{235}$ per molecule of water, said vessel being substantially surrounded by a reflector, said reflector being selected from the class consisting of BeO, Be, graphite, $D_2O$, and $H_2O$, said reflector determining the critical mass to sphere radius ratio in accordance with Figure 15.

23. A neutronic reactor utilizing liquid fuel comprising a spherical vessel substantially filled with said liquid, said liquid comprising a solution of ordinary water and uranium sulfate, said uranium having at least about 12.5 percent by weight of the fissionable isotope $U^{235}$, said solution having a concentration of $2.8 \times 10^{-3}$ atoms of said $U^{235}$ per molecule of water, said vessel substantially surrounded by a reflector, said reflector being selected from the class consisting of BeO, Be, graphite, $D_2O$, and $H_2O$, said reflector determining the radius of said sphere in accordance with Figure 16.

24. A neutronic reactor utilizing liquid fuel comprising a spherical vessel, said vessel substantially filled with said liquid, said liquid comprising an ordinary water solution of a soluble salt of uranium, said uranium having at least about 12.5 percent by weight of the fissionable isotope $U^{235}$, said solution having a concentration greater than $10^{-3}$ atoms of $U^{235}$ per molecule of water, said vessel being substantially surrounded by a $D_2O$ reflector, said reflector determining the critical mass to sphere radius ratio in accordance with curve 400 of Figure 15.

25. A neutronic reactor comprising a spherical vessel having a radius of at least about 6 inches, a liquid, said vessel substantially filled with said liquid, said liquid comprising an ordinary water solution of a soluble salt of uranium, said uranium having at least about one percent by weight of the fissionable isotope $U^{235}$, said solution having a concentration of greater than $10^{-3}$ atoms of $U^{235}$ per molecule of water, the quantity of fissionable isotope in solution being in excess of 500 grams and sufficient to provide a critical mass in said vessel, and a neutron reflector substantially surrounding said vessel.

References Cited in the file of this patent

UNITED STATES PATENTS

| | | |
|---|---|---|
| 1,912,981 | Hoy | June 6, 1933 |
| 1,913,945 | Morris et al. | June 13, 1933 |
| 2,206,634 | Fermi et al. | July 2, 1940 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |
| 861,390 | France | Oct. 28, 1940 |
| 648,293 | Great Britain | |

(Corresponds to the French Patent)

OTHER REFERENCES

Von Halban, Joliot, Kowarski and Perrin: J. de Phys., ser. 7, 10, 428 (1939).

Anderson, Fermi and Szilard: Phys. Rev., 56 284–286 (1939).

Roberts et al.: Jour. of Applied Physics, September 1939, pp. 612–14.

Power, July 1940, pp. 56–59.

U. S. Atomic Energy Comm. AECD–3063 (September 4, 1944), Water Boiler Los Alamos Scientific Lab. pp. 1–31 Technical Inf. Service, Oak Ridge, Tenn.

A General Account of the Development of Methods of Using Atomic Energy by H. D. Smyth, August 1945. For sale by the Supt. of Doc., Washington 25, D. C., pp. 16–27, 152, 153, 177–181.